US010075039B2

(12) United States Patent
Ishizuka et al.

(10) Patent No.: US 10,075,039 B2
(45) Date of Patent: Sep. 11, 2018

(54) ROTATING ELECTRIC MACHINE AND METHOD OF MANUFACTURING SAME

(71) Applicant: DENSO CORPORATION, Kariya, Aichi-pref. (JP)

(72) Inventors: Atsuo Ishizuka, Kariya (JP); Hiroshi Kaneiwa, Kariya (JP); Keiji Kondou, Kariya (JP); Hiromitsu Asai, Kariya (JP)

(73) Assignee: DENSO CORPORATION, Kariya (JP)

( * ) Notice: Subject to any disclaimer, the term of this patent is extended or adjusted under 35 U.S.C. 154(b) by 234 days.

(21) Appl. No.: 15/219,752

(22) Filed: Jul. 26, 2016

(65) Prior Publication Data

US 2017/0033636 A1  Feb. 2, 2017

(30) Foreign Application Priority Data

Jul. 28, 2015  (JP) .................................. 2015-148301

(51) Int. Cl.
| | |
|---|---|
| H02K 1/00 | (2006.01) |
| H02K 3/12 | (2006.01) |
| H02K 3/32 | (2006.01) |
| H02K 3/04 | (2006.01) |
| H02K 3/38 | (2006.01) |
| H02K 15/00 | (2006.01) |

(52) U.S. Cl.
CPC .................. *H02K 3/12* (2013.01); *H02K 3/04* (2013.01); *H02K 3/32* (2013.01); *H02K 3/38* (2013.01); *H02K 15/0037* (2013.01); *H02K 15/0081* (2013.01)

(58) Field of Classification Search
CPC ......... H02K 3/04; H02K 3/32; H02K 15/0025
USPC ....... 310/201, 203, 204, 205, 206, 207, 208; 29/596
See application file for complete search history.

(56) References Cited

U.S. PATENT DOCUMENTS

| | | | |
|---|---|---|---|
| 5,936,326 A | 8/1999 | Umeda et al. | |
| 5,952,749 A | 9/1999 | Umeda et al. | |
| 5,955,810 A | 9/1999 | Umeda et al. | |
| 5,965,965 A | 10/1999 | Umeda et al. | |
| 5,982,068 A | 11/1999 | Umeda et al. | |
| 5,986,375 A | 11/1999 | Umeda et al. | |
| 5,994,813 A | 11/1999 | Umeda et al. | |
| 5,998,903 A | 12/1999 | Umeda et al. | |
| 6,011,332 A | 1/2000 | Umeda et al. | |
| 6,020,669 A | 2/2000 | Umeda et al. | |
| 6,051,906 A | 4/2000 | Umeda et al. | |
| 6,091,169 A | 7/2000 | Umeda et al. | |

(Continued)

FOREIGN PATENT DOCUMENTS

| | | | |
|---|---|---|---|
| JP | H03-190541 A | 8/1991 | |
| JP | H07-231588 A | 8/1995 | |

(Continued)

*Primary Examiner* — Hanh Nguyen
(74) *Attorney, Agent, or Firm* — Oliff PLC

(57) ABSTRACT

A rotating electric machine includes a weld formed by welding end portions of a pair of electric conductors for forming a coil and a weld-insulating member that covers, at least, a surface of the weld. The weld has an uneven portion formed on at least part of the surface thereof. The uneven portion is constituted of a plurality of annular recesses and a plurality of annular protrusions. The annular recesses are formed alternately and continuously with the annular protrusions.

9 Claims, 25 Drawing Sheets

(56) References Cited

U.S. PATENT DOCUMENTS

| | | | |
|---|---|---|---|
| 6,097,130 A | 8/2000 | Umeda et al. | |
| 6,124,660 A | 9/2000 | Umeda et al. | |
| 6,137,201 A | 10/2000 | Umeda et al. | |
| 6,144,136 A | 11/2000 | Umeda et al. | |
| 6,147,432 A * | 11/2000 | Kusase | H02K 3/50 310/179 |
| 6,181,043 B1 | 1/2001 | Kusase et al. | |
| 6,181,045 B1 | 1/2001 | Umeda et al. | |
| 6,198,190 B1 | 3/2001 | Umeda et al. | |
| 6,291,918 B1 | 9/2001 | Umeda et al. | |
| 6,403,921 B1 * | 6/2002 | Maeda | H02K 3/12 219/125.11 |
| 6,459,177 B1 | 10/2002 | Nakamura et al. | |
| 6,459,186 B1 | 10/2002 | Umeda et al. | |
| 6,462,453 B1 * | 10/2002 | Asao | H02K 3/12 310/179 |
| 6,490,779 B1 * | 12/2002 | Tokizawa | H02K 3/12 29/596 |
| 8,878,414 B2 * | 11/2014 | Mourou | H02K 15/0081 310/180 |
| 2002/0033649 A1 * | 3/2002 | Oohashi | H02K 3/28 310/184 |
| 2004/0145257 A1 * | 7/2004 | Oohashi | H02K 3/38 310/71 |
| 2011/0163620 A1 * | 7/2011 | Nakamura | H02K 3/38 310/71 |
| 2011/0181143 A1 | 7/2011 | Hasegawa et al. | |
| 2011/0181144 A1 * | 7/2011 | Ishizuka | H02K 3/38 310/180 |

FOREIGN PATENT DOCUMENTS

| | | |
|---|---|---|
| JP | 2006-166680 A | 6/2006 |
| JP | 2008-228533 A | 9/2008 |
| JP | 2009-232607 A | 10/2009 |

* cited by examiner

ROTATING ELECTRIC MACHINE AND METHOD OF MANUFACTURING SAME

CROSS-REFERENCE TO RELATED APPLICATION

This application is based on and claims priority from Japanese Patent Application No. 2015-148301 filed on Jul. 28, 2015, the content of which is hereby incorporated by reference in its entirety into this application.

BACKGROUND

1 Technical Field

The present invention relates to rotating electric machines which have welds formed by welding end portions of electric conductors for forming a coil and weld-insulating members that cover, at least, the surfaces of the welds, and to methods of manufacturing the rotating electric machines.

2 Description of Related Art

There are known rotating electric machines which have welds formed by welding end portions of electric conductors for forming a coil and weld-insulating members that cover, at least, the surfaces of the welds.

In the rotating electric machines, there is generally a large temperature difference between when the rotating electric machines are in an operating state and when the rotating electric machines are in a stopped state. Therefore, with the temperature change in the rotating electric machines, the welds and the weld-insulating members repeatedly undergo expansion and contraction. However, the material composition of the welds is different from the material composition of the weld-insulating members; thus, the coefficient of thermal expansion of the welds is also different from the coefficient of thermal expansion of the weld-insulating members. Consequently, due to the repeated expansion and contraction of the welds and the weld-insulating members with the temperature change, the adhesion force of the weld-insulating members to the respective welds is lowered, thereby making it easy for the weld-insulating members to peel off from the respective welds.

Japanese Patent No. JP5510709B2 discloses a rotating electric machine which has joints (or welds) formed by welding end portions of electric conductors for forming a coil and electrically-insulative resin members (or weld-insulating members) that cover the surfaces of the joints. The electric conductors are made of a copper oxide having a high oxygen concentration. During the welding of the end portions of the electric conductors, blow holes are created to form uneven portions on the surfaces of the joints. The resin members are provided to cover the surfaces of the joints which include the uneven portions. Consequently, compared to the case of having no uneven portions formed on the surfaces of the joints, the adhesion areas of the resin members to the respective joints are increased. Moreover, during the formation of the resin members, the molten resin members are impregnated into recesses of the uneven portions of the joints and solidified therein into a wedge shape. As a result, it is possible to suppress the adhesion force of the resin members to the respective joints from being lowered due to the repeated expansion and contraction of the joints and the resin members with the temperature change in the rotating electric machine; thus, it is possible to suppress the resin members from peeling off from the respective joints.

However, in the rotating electric machine disclosed in the above patent document, the uneven portions of the joints are formed by the blow holes that are randomly created in the surfaces of the joints. Therefore, on the surfaces of the joints, there are randomly-sized protrusions formed into a dot-shape. Consequently, stress may concentrate on peripheral portions of the resin members which abut some of the protrusions. As a result, the adhesion force of the peripheral portions of the resin members to the respective joints may be lowered, causing the resin members to peel off from the respective joints.

SUMMARY

According to exemplary embodiments, there is provided a rotating electric machine which includes a weld formed by welding end portions of a pair of electric conductors for forming a coil and a weld-insulating member that covers, at least, a surface of the weld. The weld has an uneven portion formed on at least part of the surface thereof. The uneven portion is constituted of a plurality of annular recesses and a plurality of annular protrusions. The annular recesses are formed alternately and continuously with the annular protrusions.

If the protrusions of the uneven portion of the weld were dot-shaped as taught by Japanese Patent No. JP5510709B2, due to the repeated expansion and contraction of the weld and the weld-insulating member with temperature change, stress might concentrate on peripheral portions of the weld-insulating member which abut some of the protrusions. As a result, the adhesion force of the peripheral portions of the weld-insulating member to the weld might be lowered, causing the weld-insulating member to peel off from the weld. However, according to the exemplary embodiments, the protrusions of the uneven portion of the weld are annular-shaped. Therefore, even if the weld and the weld-insulating member repeat expansion and contraction with temperature change, stress concentration hardly occurs in the weld-insulating member. Moreover, according to the exemplary embodiments, the recesses of the uneven portion of the weld are also annular-shaped. Therefore, during the formation of the weld-insulating member, the molten material of the weld-insulating member is impregnated into the annular-shaped recesses of the uneven portion of the weld and solidified therein to form annular-shaped protrusions. Consequently, the annular-shaped protrusions of the weld-insulating member are respectively fitted in the annular-shaped recesses of the uneven portion of the weld. As a result, it becomes possible to more reliably suppress the adhesion force of the weld-insulating member to the weld from being lowered due to the repeated expansion and contraction of the weld and the weld-insulating member with temperature change; thus, it becomes possible to more reliably suppress the weld-insulating member from peeling off from the weld.

Preferably, the weld is formed so that when viewed from an opposite side of the weld to the pair of electric conductors, a region surrounded by an outline of the weld is within a region surrounded by an outline of the pair of electric conductors.

The rotating electric machine may further include a pair of conductor-insulating members that respectively cover entire outer peripheries of the pair of electric conductors except for the end portions of the pair of electric conductors. Each of the pair of conductor-insulating members may preferably have an increased-diameter portion formed adjacent to the end portion of the respective one of the pair of electric conductors so as to be increased in diameter in a direction toward the end portion of the respective electric conductor. The weld-insulating member may preferably cover the increased-diameter portions of the pair of conductor-insulating members as well as the surface of the weld.

Preferably, the uneven portion is formed on the surface of the weld except for a predetermined area of the surface; the predetermined area is adjacent to the pair of electric conductors.

According to one exemplary embodiment, there is provided a first method of manufacturing the rotating electric machine. The first method includes: welding the end portions of the pair of electric conductors to form the weld; and forming the uneven portion by pressing a die, which has protrusions and recesses formed therein, against the surface of the weld.

According to another exemplary embodiment, there is provided a second method of manufacturing the rotating electric machine. The second method includes: welding the end portions of the pair of electric conductors to form the weld; and forming the uneven portion by cutting the surface of the weld with a cutting tool.

According to yet another exemplary embodiment, there is provided a third method of manufacturing the rotating electric machine. The third method includes: welding the end portions of the pair of electric conductors to form the weld; and funning the uneven portion, during the welding of the end portions of the pair of electric conductors, by vibration of molten parts of the end portions of the pair of electric conductors, the vibration being caused by at least one of a shield gas flow and a magnetic field created during the welding.

With any of the first, second and third methods, blow holes are formed neither on the surface of the weld nor inside the weld. Consequently, it becomes possible to reliably form the uneven portion on the surface of the weld without lowering the mechanical strength of the weld. As a result, it becomes possible to enhance the adhesion force of the weld-insulating member to the weld.

In the third method, it is preferable that each of the pair of electric conductors is constituted of a plurality of electric conductor wires. Further, it is also preferable that each of the electric conductor wires has a circular cross-sectional shape.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Figure 1:
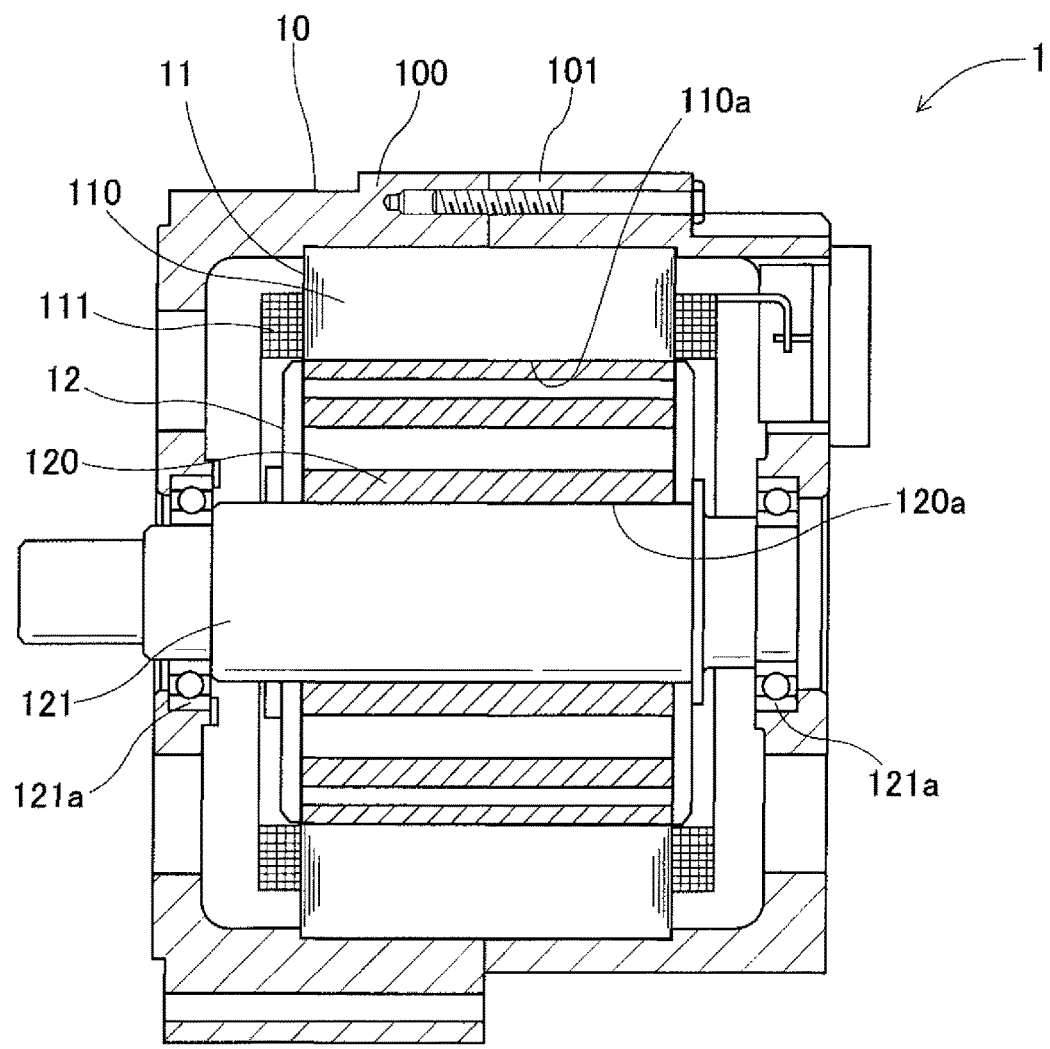
FIG. 1 is a partially cross-sectional view, taken along an axial direction, of a rotating electric machine according to a first embodiment.

Exemplary embodiments and their modifications will be described hereinafter with reference to FIGS. 1-29. It should be noted that for the sake of clarity and understanding, identical components having identical functions throughout the whole description have been marked, where possible, with the same reference numerals in each of the figures and that for the sake of avoiding redundancy, descriptions of the identical components will not be repeated.

First Embodiment

FIG. 1 shows the overall configuration of a rotating electric machine 1 according to a first embodiment.

In the present embodiment, the rotating electric machine 1 is configured as a motor-generator for use in a motor vehicle. Specifically, upon being supplied with electric power from a battery (not shown) of the vehicle, the rotating electric machine 1 functions as an electric motor to generate torque (or driving force) for driving the motor vehicle. Otherwise, upon being supplied with torque from an engine (not shown) of the vehicle, the rotating electric machine 1 functions as an electric generator to generate electric power for charging the battery.

As shown in FIG. 1, the rotating electric machine 1 includes a housing 10, a stator 11 and a rotor 12.

The housing 10 receives both the stator 11 and the rotor 12 therein and rotatably supports the rotor 12. The housing 10 is comprised of a pair of cup-shaped housing pieces 100 and 101 which are jointed together at the open ends thereof.

The stator 11 is fixed in the housing 10 so as to surround the radially outer periphery of the rotor 12. The stator 11 constitutes part of a magnetic circuit formed in the rotating electric machine 1. When supplied with electric current, the stator 11 generates magnetic flux. Otherwise, when magnetic flux through the stator 11 is generated by the rotor 12, the stator 11 generates alternating current.

Figure 2:
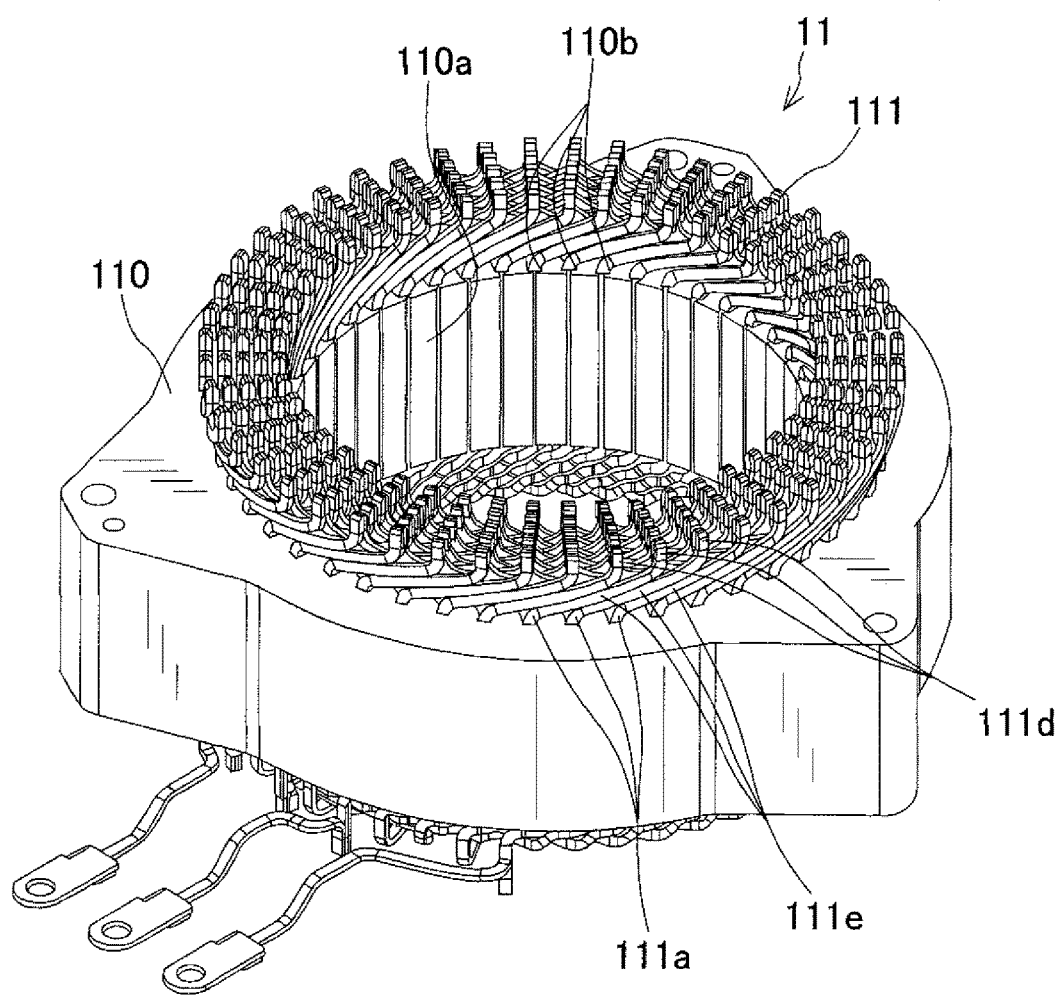
FIG. 2 is a perspective view of a stator of the rotating electric machine, the stator being in a state where end portions of electric conductor segments have not been welded to form a stator coil of the stator.
Figure 3:
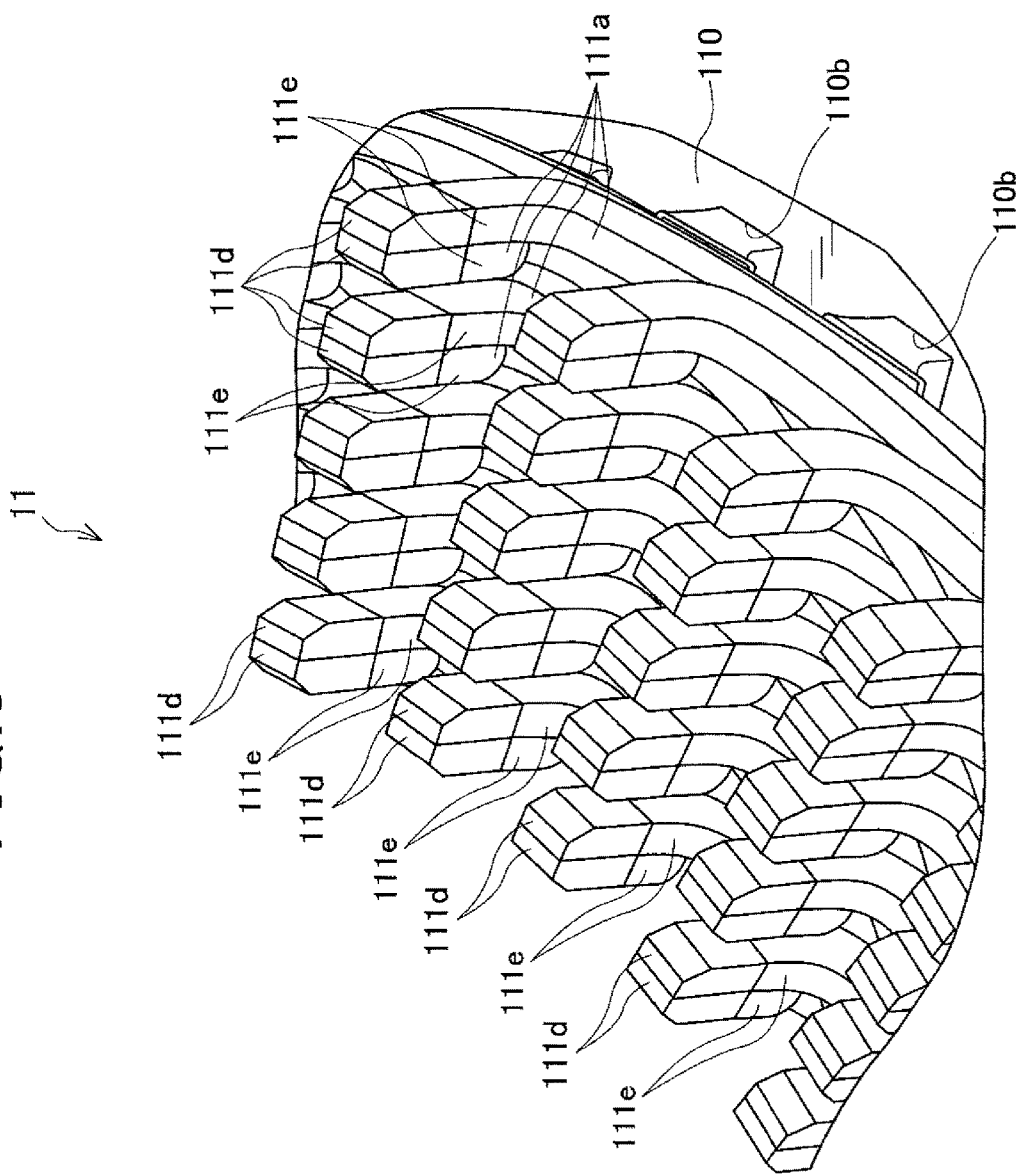
FIG. 3 is a perspective view of part of the stator before the end portions of the electric conductor segments are welded.

As shown in FIGS. 1 and 2, the stator 11 includes a hollow cylindrical (or annular) stator core 110 and a stator coil 111 mounted on the stator core 110.

The stator core 110 is fixed to the inner circumferential surfaces of the housing pieces 100 and 101. The stator core 110 is made of a magnetic material and constitutes part of the magnetic circuit formed in the rotating electric machine 1. The stator core 110 holds the stator coil 111. At a radially central part of the stator core 110, there is formed a circular through-hole 110a so as to axially penetrate the stator core 110. Moreover, in the stator core 110, there are formed a plurality of slots 110b that each axially penetrate the stator core 110 and are circumferentially spaced from one another at equal intervals. Each of the slots 110b has a substantially rectangular cross section perpendicular to the axial direction of the stator core 110.

As shown in FIGS. 2-7, the stator coil 111 includes a plurality of electric conductor segments 111a that are welded to one another, a plurality of welds 111b each of which is formed between one pair of the electric conductor segments 111a, and a plurality of weld-insulating members 111c each of which is provided to cover the surface of one of the welds 111b.

Figure 4:
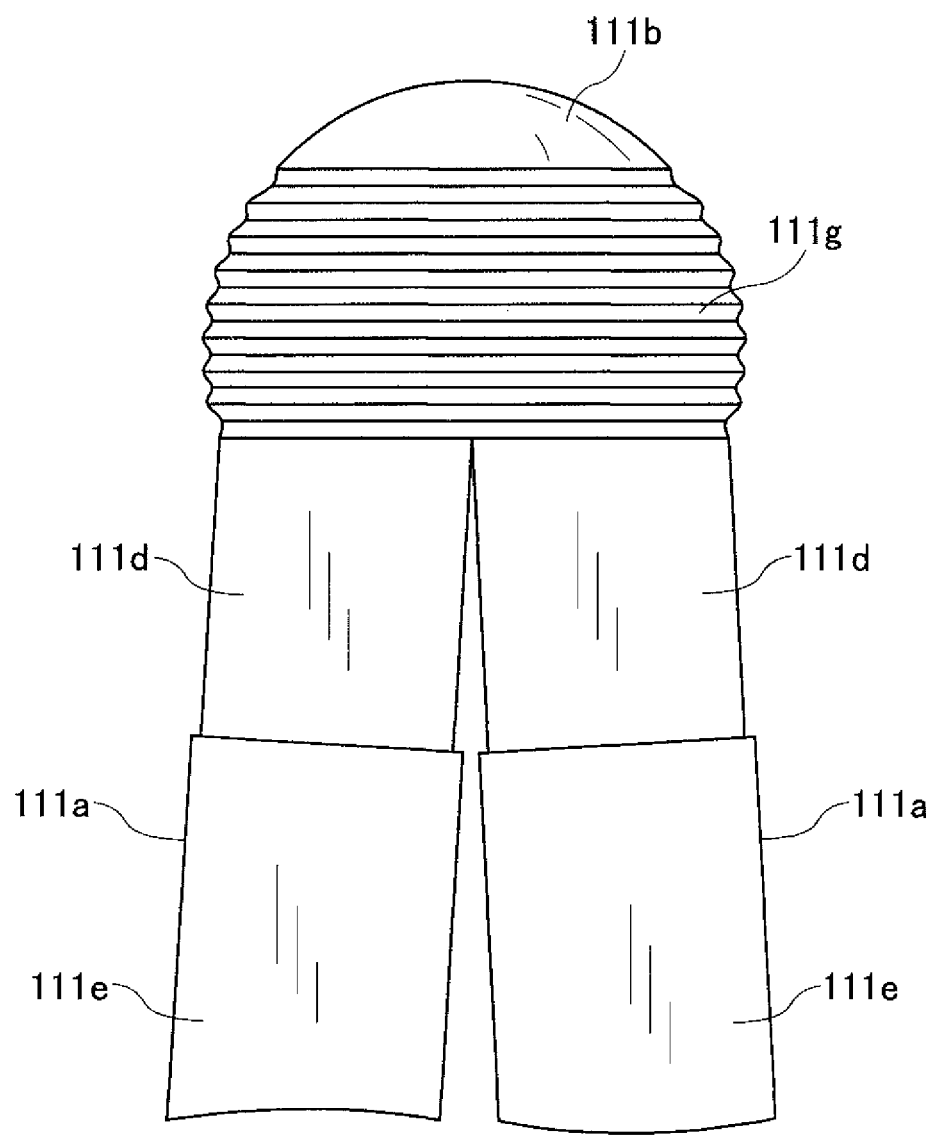
FIG. 4 is a front view of a pair of the electric conductor segments welded to each other.
Figure 6:
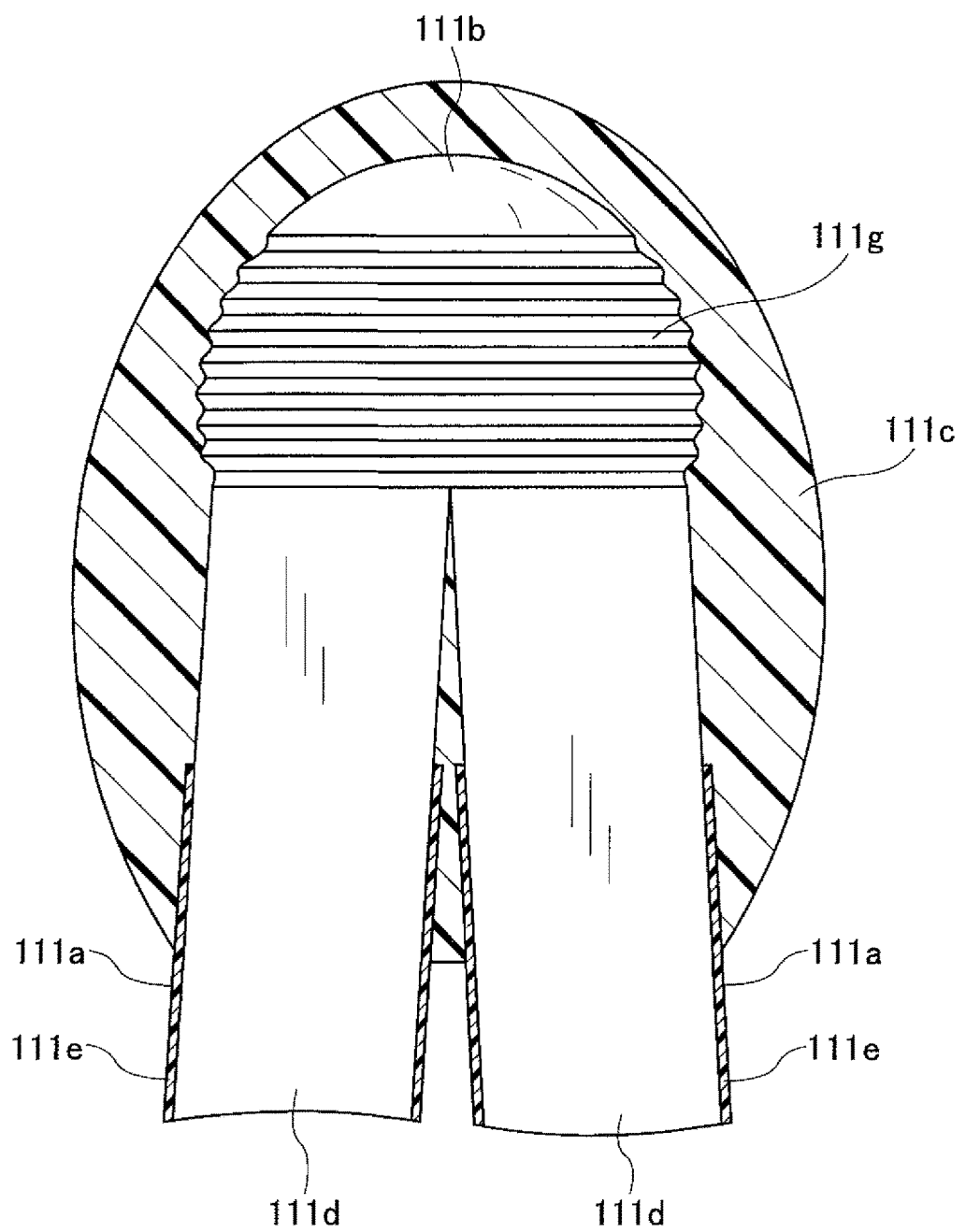
FIG. 6 is a partially cross-sectional view illustrating a weld formed between the pair of the electric conductor segments and a weld-insulating member that covers the surface of the weld.
Figure 8:
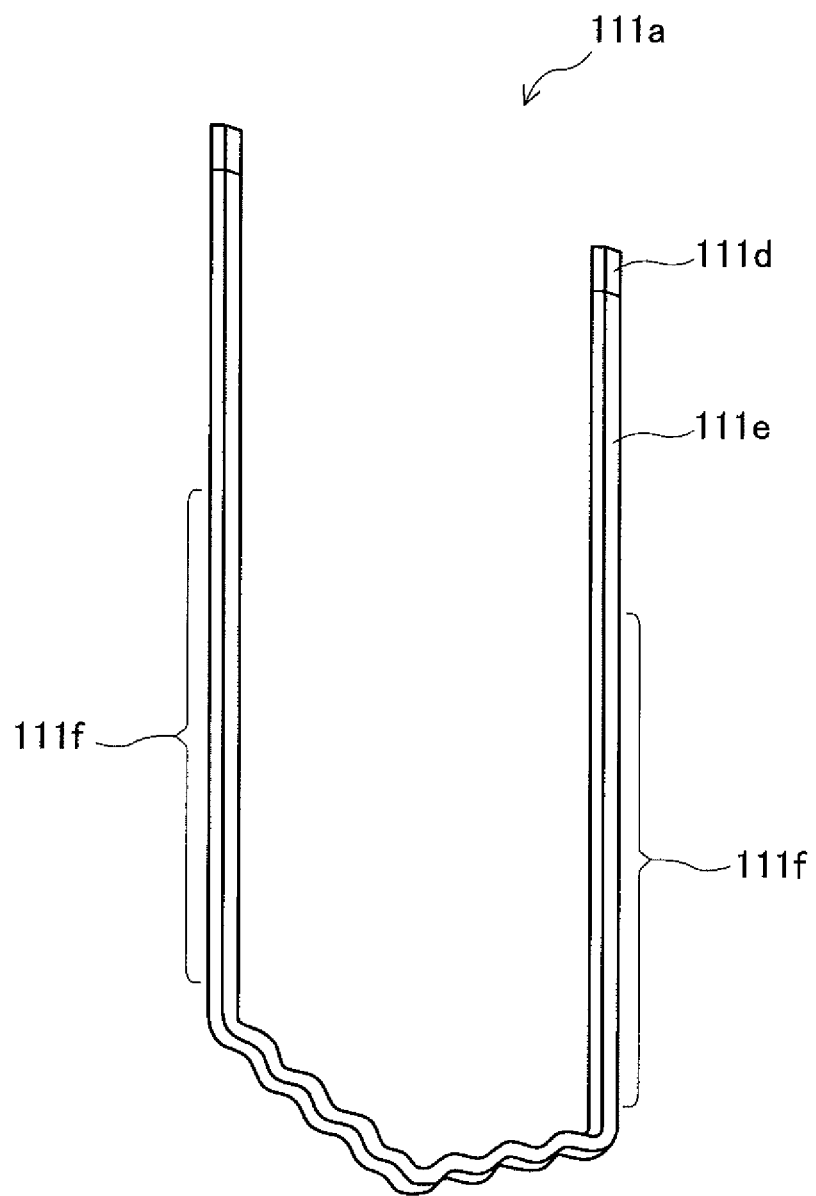
FIG. 8 is a perspective view of one of the electric conductor segments.

In the present embodiment, as shown in FIG. 8, each of the electric conductor segments 111a is substantially U-shaped. Moreover, as shown in FIGS. 4, 6 and 8, each of the electric conductor segments 111a includes an electric conductor 111d and a conductor-insulating member 111e.

The electric conductor 111d is obtained by cutting an electric conductor wire, which is made of an electrically-conductive metal (e.g., copper) and has a substantially rectangular cross-sectional shape, into a predetermined length and shaping it into a substantially U-shape.

The conductor-insulating member 111e is made, for example, of an electrically-insulative resin. The conductor-insulating member 111e is provided so as to cover the entire outer periphery of the electric conductor 111d except for a pair of end portions of the substantially U-shaped electric conductor 111d.

In addition, as shown in FIG. 8, each of the electric conductor segments 111a has a pair of in-slot portions 111f that are respectively received in two different ones of the slots 110b of the stator core 110.

In the present embodiment, the stator coil 111 is formed by: (1) inserting the electric conductor segments 111a into the respective slots 110b of the stator core 110 from a first axial side (i.e., the lower side in FIGS. 2 and 3) of the stator core 110 to have the in-slot portions 111f of the electric conductor segments 111a received in the respective slots 110b; (2) twisting distal parts of each of the electric conductor segments 111a, which protrude outside the respective slots 110b of the stator core 110 on a second axial side (i.e., the upper side in FIGS. 2 and 3) of the stator core 110, respectively toward opposite circumferential sides; and (3) welding each corresponding pair of end portions of the twisted distal parts of all the electric conductor segments 111a.

Each of the welds 111b is formed between end portions of one pair of the electric conductors 111d of the electric conductor segments 111a. Moreover, in the present embodiment, as shown in FIG. 5, each of the welds 111b is formed so that when viewed from the opposite side of the weld 111b to the pair of the electric conductors 111d, a region surrounded (or demarcated) by the outline of the weld 111b protrudes from a region surrounded by the outline of the pair of the electric conductors 111d.

Figure 5:
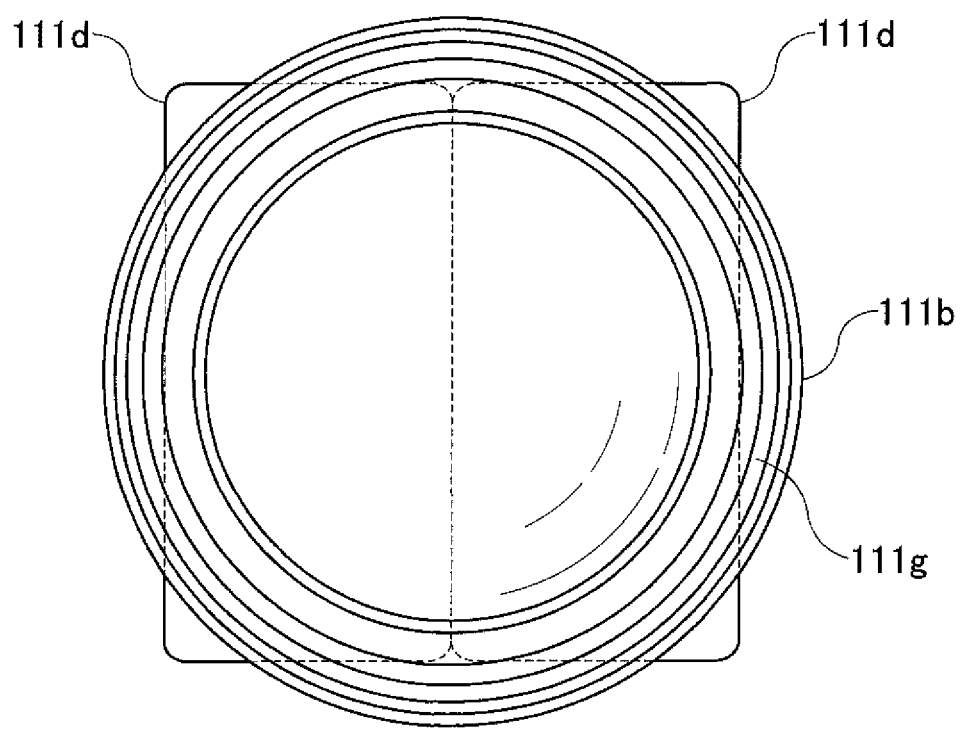
FIG. 5 is a top view of the pair of the electric conductor segments welded to each other.

Furthermore, as shown in FIGS. 4 and 5, each of the welds 111b has an uneven portion 111g formed on the surface thereof. The uneven portion 111g is constituted of a plurality of annular recesses and a plurality of annular protrusions. The annular recesses are formed alternately and continuously with the annular protrusions.

Figure 9:
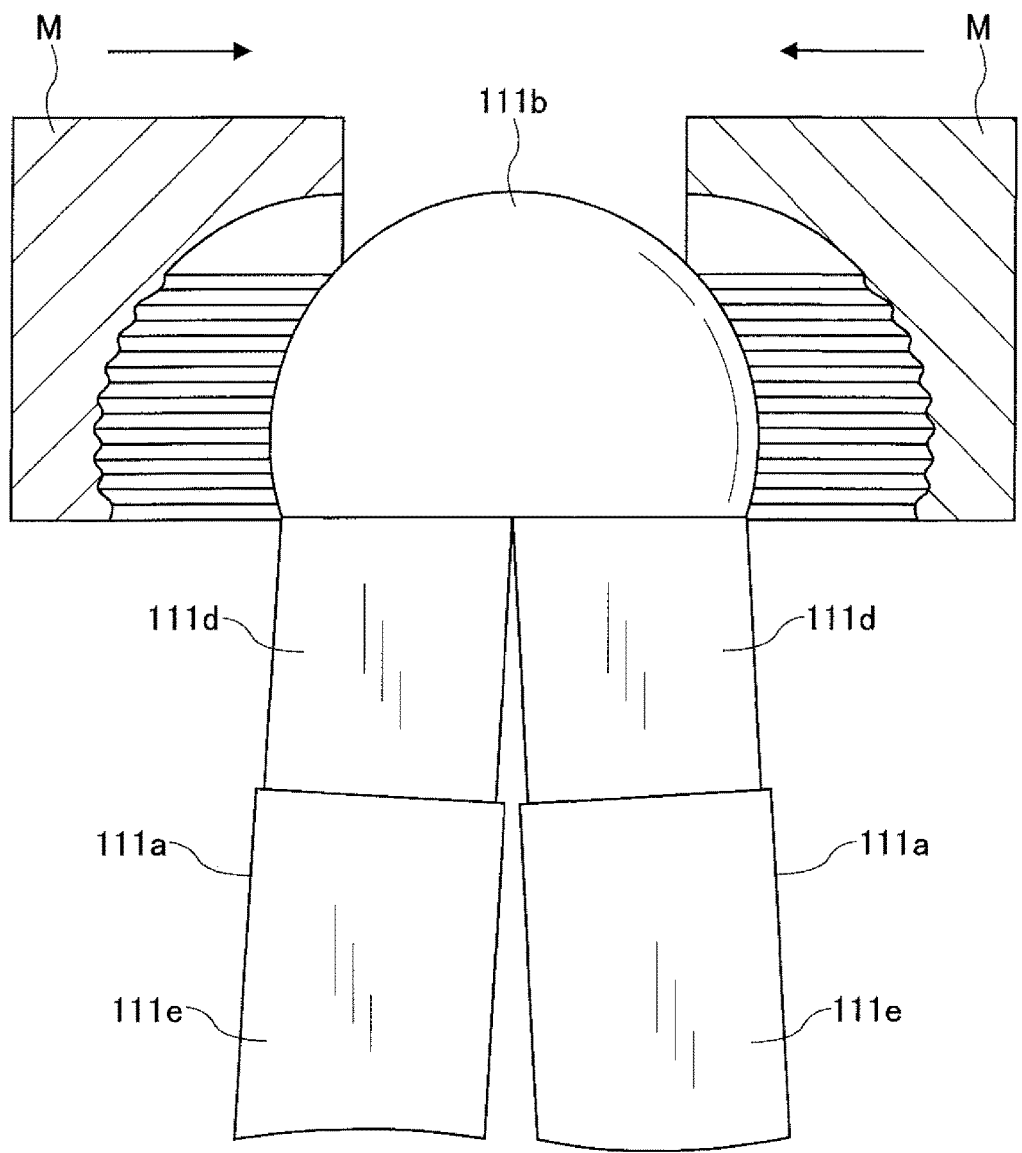
FIG. 9 is a schematic view illustrating a method of forming uneven portions of the welds according to the first embodiment.

In the present embodiment, as shown in FIG. 9, the uneven portion 111g is formed by pressing a die M, which has protrusions and recesses formed on an interior wall surface thereof, against the surface of the weld 111b.

Moreover, in the present embodiment, as shown in FIG. 4, the uneven portion 111g is formed over the entire surface of the weld 111b except for a predetermined area at the distal end of the weld 111b on the opposite side to the pair of the electric conductors 111d. That is, the uneven portion 111g is formed on part of the surface of the weld 111b which is adjacent to the pair of the electric conductors 111d.

Figure 7:
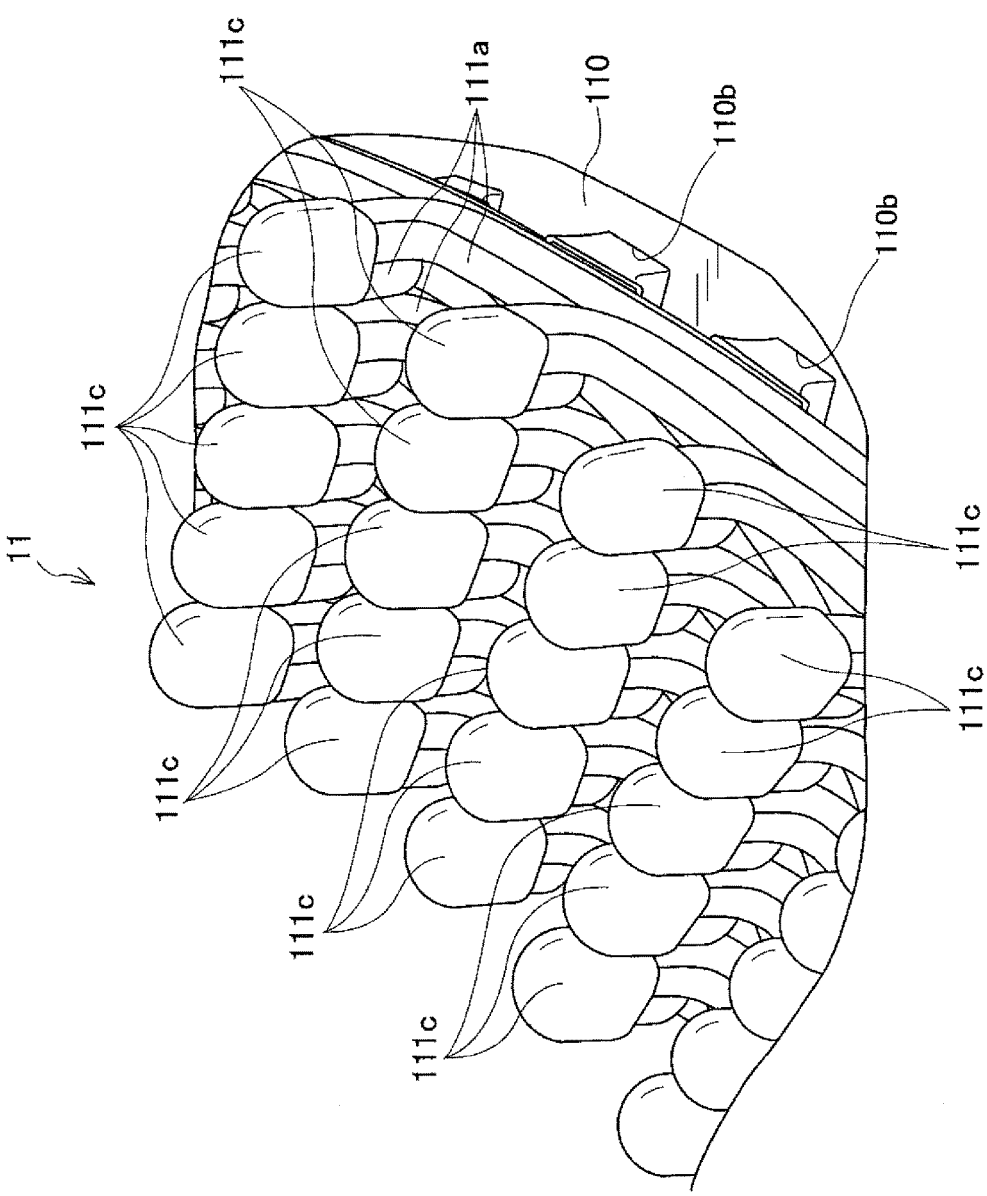
FIG. 7 is a perspective view of part of the stator after the end portions of the electric conductor segments are welded and the welds formed between the end portions of the electric conductor segments are covered by the respective weld-insulating members.

Each of the weld-insulating members 111c is made, for example, of an electrically-insulative resin. As shown in FIGS. 6 and 7, each of the weld-insulating members 111c is provided so as to cover the surface of one of the welds 111b and end portions of the conductor-insulating members 111e respectively covering the pair of the electric conductors 111d joined by the weld 111b.

Referring back to FIG. 1, the rotor 12 constitutes part of the magnetic circuit formed in the rotating electric machine 1. When magnetic flux through the rotor 12 is generated by the stator 11, the rotor 12 generates torque. Otherwise, when rotated by torque supplied by the engine of the vehicle, the rotor 12 generates magnetic flux passing through the stator coil 111, thereby inducing alternating current in the stator coil 111. The rotor 12 includes a hollow cylindrical (or annular) rotor core 120 and a rotating shaft 121.

The rotor core 120 is made of a magnetic material and constitutes part of the magnetic circuit formed in the rotating electric machine 1. At a radially central part of the rotor core 120, there is formed a circular through-hole 120a so as to axially penetrate the rotor core 120. Moreover, on a radially outer periphery of the rotor core 120, there are arranged magnets to form a plurality of magnetic poles. The rotor core 120 is located in the through-hole 110a of the stator core 110, so that the magnets arranged on the radially outer periphery of the rotor core 120 face the radially inner surface of the stator core 110 through a predetermined air gap formed therebetween.

The rotating shaft 121 is made of a metal and has a substantially cylindrical shape. The rotating shaft 121 is fixedly fitted in the through-hole 120a of the rotor core 120 and rotatably supported by the housing 10 via a pair of bearings 121a.

Next, operation of the rotating electric machine 1 according to the present embodiment will be described.

As mentioned previously, in the present embodiment, the rotating electric machine 1 is configured as a motor-generator that selectively operates in either a motor mode or a generator mode.

In the motor mode, electric power is supplied from the battery of the motor vehicle to the stator coil 111. Consequently, electric current flows in the stator coil 111, generating magnetic flux. The generated magnetic flux passes through the rotor 12, causing the rotor 12 to rotate and generate torque for driving the motor vehicle.

In the generator mode, the rotor 12 is rotated by torque supplied from the engine of the motor vehicle, generating magnetic flux. The generated magnetic flux passes through the stator coil 111, inducing alternating current in the stator coil 111. The alternating current is then rectified into direct current, and the obtained direct current is used to charge the battery of the motor vehicle.

According to the present embodiment, it is possible to achieve the following advantageous effects.

In the present embodiment, the rotating electric machine 1 includes the welds 111b and the weld-insulating members 111c. Each of the welds 111b is formed by welding end portions of one pair of the electric conductors 111d of the electric conductor segments 111a for forming the stator coil 111. Each of the weld-insulating members 111c covers, at least, the surface of one of the welds 111b. Moreover, each of the welds 111b has the uneven portion 111g formed on at least part of the surface thereof. The uneven portion 111g is constituted of the plurality of annular recesses and the plurality of annular protrusions. The annular recesses are formed alternately and continuously with the annular protrusions.

If the protrusions of the uneven portions 111g of the welds 111b were dot-shaped as taught by Japanese Patent No. JP5510709B2, due to the repeated expansion and contraction of the welds 111b and the weld-insulating members 111c with temperature change, stress might concentrate on peripheral portions of the weld-insulating members 111c which abut some of the protrusions. As a result, the adhesion force of the peripheral portions of the weld-insulating members 111c to the respective welds 111b might be lowered, causing the weld-insulating members 111c to peel off from the respective welds 111b. However, in the present embodiment, the protrusions of the uneven portions 111g of the welds 111b are annular-shaped. Therefore, even if the welds 111b and the weld-insulating members 111c repeat expansion and contraction with temperature change, stress concentration hardly occurs in the weld-insulating members 111c. Moreover, in the present embodiment, the recesses of the uneven portions 111g of the welds 111b are also annular-shaped. Therefore, during the formation of the weld-insulating members 111c, the molten material of the weld-insulating members 111c (i.e., the molten electrically-insulative resin) is impregnated into the annular-shaped recesses of the uneven portions 111g of the welds 111b and solidified therein to form annular-shaped protrusions. Consequently, the annular-shaped protrusions of the weld-insulating members 111c are respectively fitted in the annular-shaped recesses of the uneven portions 111g of the welds 111b. As a result, it becomes possible to more reliably suppress the adhesion force of the weld-insulating members 111c to the respective welds 111b from being lowered due to the repeated expansion and contraction of the welds 111b and the weld-insulating members 111c with temperature change; thus, it becomes possible to more reliably suppress the weld-insulating members 111e from peeling off from the respective welds 111b.

Moreover, if the uneven portions 111g of the welds 111b were formed by blow holes as taught by Japanese Patent No. JP5510709B2, the mechanical strength of the welds 111b might be lowered. This is because blow holes would be formed not only on the surfaces of the welds 111b but also inside the welds 111b. However, in the present embodiment, the uneven portions 111g of the welds 111b are formed by pressing the die M, which has the protrusions and the recesses formed on the interior wall surface thereof, against the surfaces of the welds 111b. Therefore, blow holes are formed neither on the surfaces of the welds 111b nor inside the welds 111b. Consequently, it becomes possible to reliably form the uneven portions 111g on the surfaces of the welds 111b without lowering the mechanical strength of the welds 111b. As a result, it becomes possible to enhance the adhesion force of the weld-insulating members 111c to the respective welds 111b.

In addition, with the uneven portions 111g formed on the surfaces of the welds 111b, the total surface area of the welds 111b is increased. Consequently, it is possible to improve the cooling performance, thereby increasing the efficiency of the rotating electric machine 1.

Second Embodiment

A rotating electric machine 1 according to a second embodiment has almost the same structure as the rotating electric machine 1 according to the first embodiment. Accordingly, only the differences therebetween will be described hereinafter.

In the first embodiment, the uneven portions of the welds are formed by pressing the die M against the surfaces of the welds. In comparison, in the present embodiment, the uneven portions of the welds are formed by cutting the surfaces of the welds.

Figure 10:
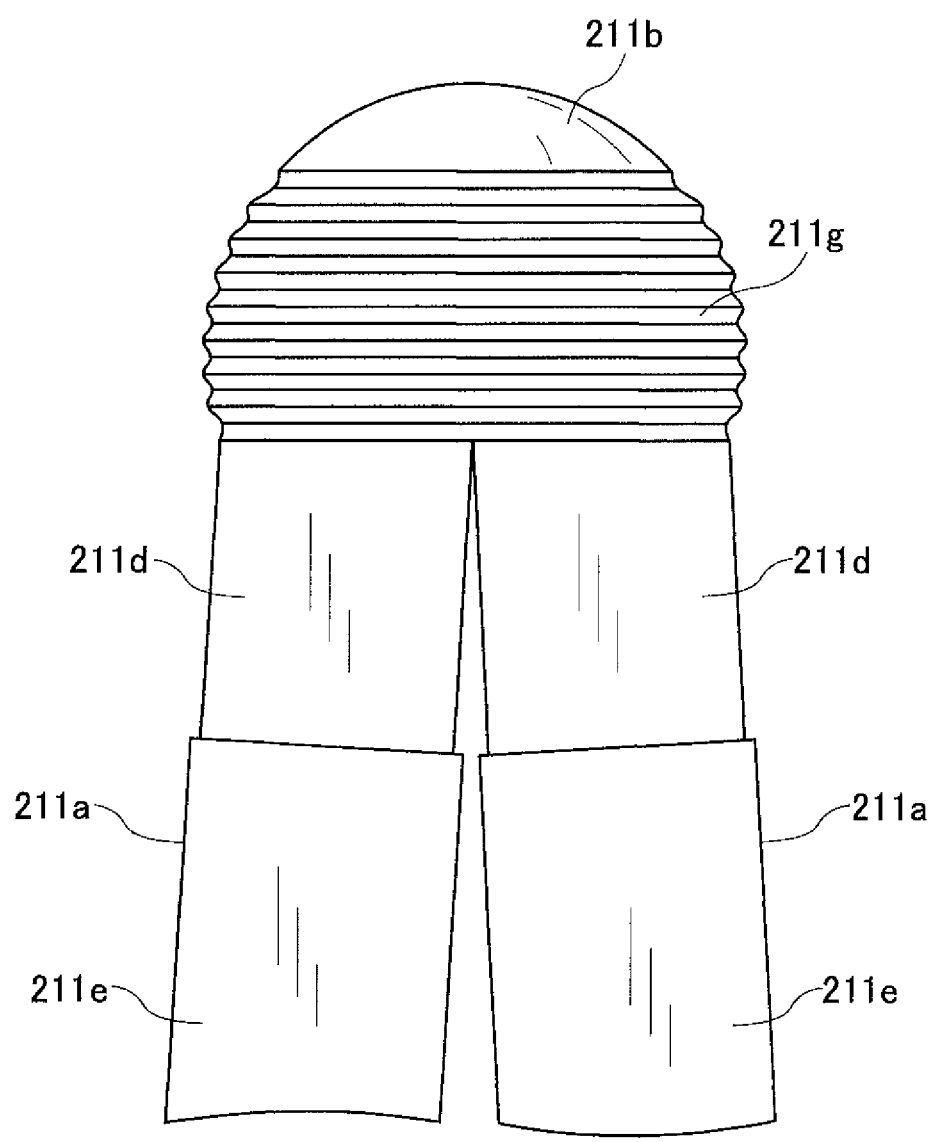
FIG. 10 is a front view of a pair of electric conductor segments, which are welded to each other, according to a second embodiment.

Specifically, in the present embodiment, as shown in FIG. 10, each of the welds 211b is formed by welding end portions of one pair of the electric conductors 211d of the electric conductor segments 211a. Moreover, each of the welds 211b has the uneven portion 211g formed on the surface thereof.

Figure 12:
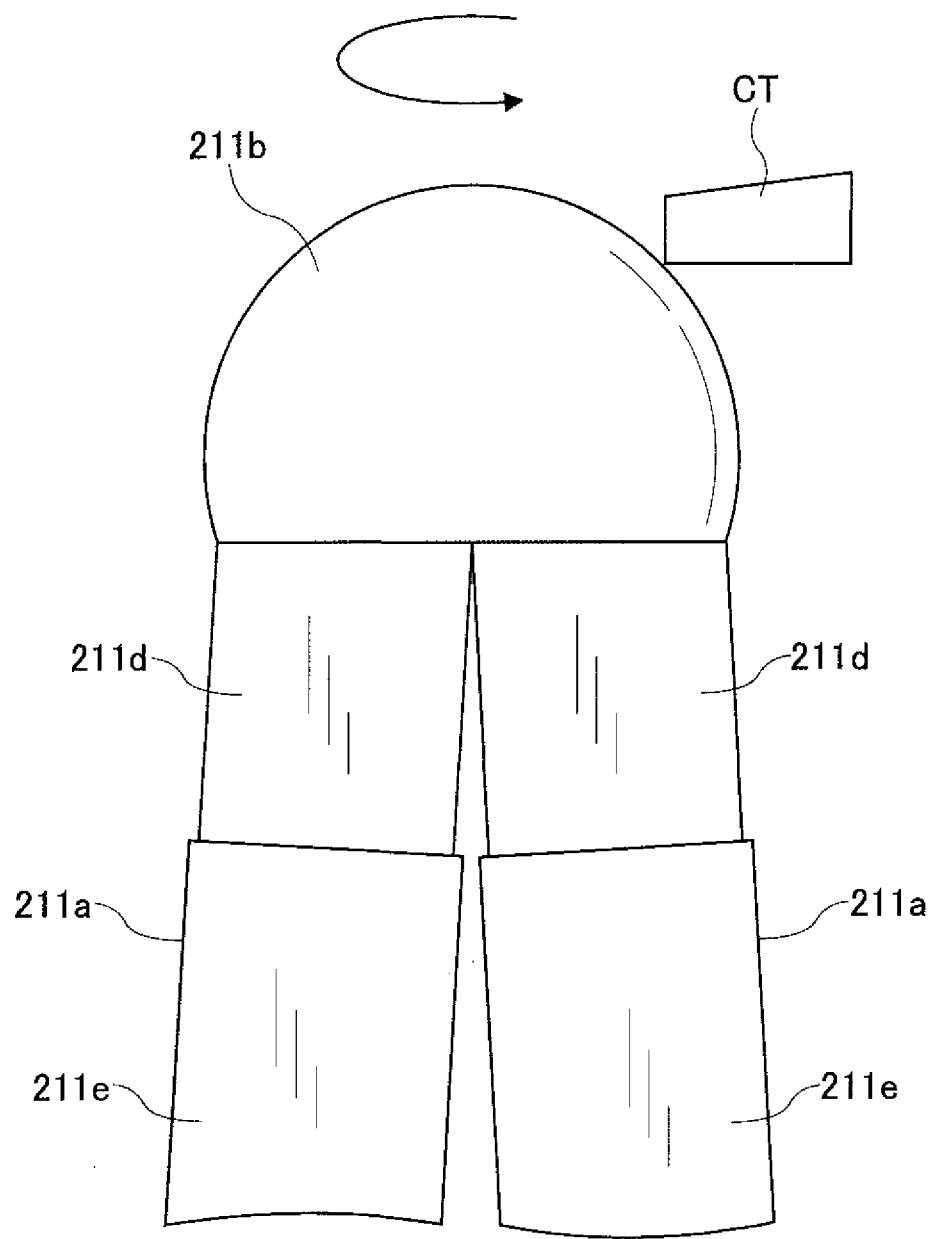
FIG. 12 is a schematic view illustrating a method of forming uneven portions of welds according to the second embodiment.

As shown in FIG. 12, the uneven portion 211g is formed by cutting at least part of the surface of the weld 211b with a cutting tool CT while rotating the weld 211b.

More specifically, in the present embodiment, as shown in FIG. 10, the uneven portion 211g is formed over the entire surface of the weld 211b except for a predetermined area at the distal end of the weld 211b on the opposite side to the pair of the electric conductors 211d. That is, the uneven portion 211g is formed on part of the surface of the weld 211b which is adjacent to the pair of the electric conductors 211d.

Figure 11:
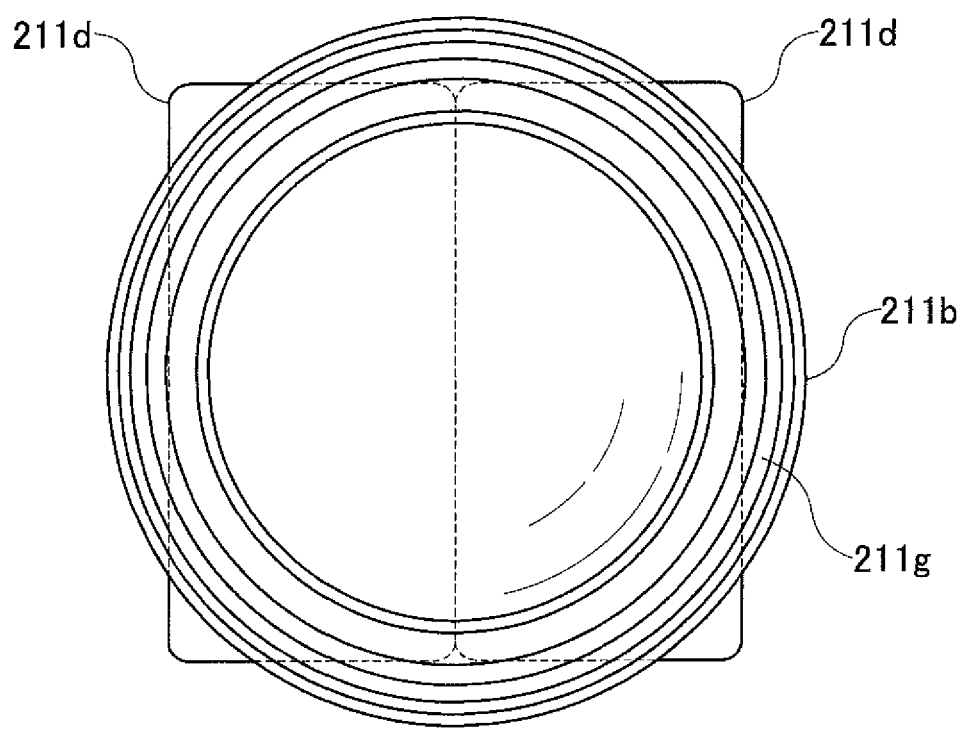
FIG. 11 is a top view of the pair of electric conductor segments, which are welded to each other, according to the second embodiment.

In the present embodiment, as shown in FIG. 11, each of the welds 211b is formed so that when viewed from the opposite side of the weld 211b to the pair of the electric conductors 211d, a region surrounded (or demarcated) by the outline of the weld 211b protrudes from a region surrounded by the outline of the pair of the electric conductors 211d.

According to the present embodiment, it is possible to achieve almost the same advantageous effects as achievable according to the first embodiment.

In particular, in the present embodiment, the uneven portions 211g of the welds 211b are formed by cutting the surfaces of the welds 211b with the cutting tool CT. Therefore, unlike the teaching of Japanese Patent No. JP5510709B2, blow holes are formed neither on the surfaces of the welds 211b nor inside the welds 211b. Consequently, it becomes possible to reliably form the uneven portions 211g on the surfaces of the welds 211b without lowering the mechanical strength of the welds 211b. As a result, it becomes possible to enhance the adhesion force of the weld-insulating members 211c (not shown) to the respective welds 211b.

Third Embodiment

A rotating electric machine 1 according to a third embodiment has almost the same structure as the rotating electric machine 1 according to the first embodiment. Accordingly, only the differences therebetween will be described hereinafter.

In the first embodiment, the uneven portions of the welds are formed by pressing the die M against the surfaces of the welds. In comparison, in the present embodiment, each of the electric conductors of the electric conductor segments is constituted of a plurality of electric conductor wires; the uneven portions of the welds are formed by a shield gas flow and a magnetic field created during the welding of end portions of the electric conductors.

Figure 13:
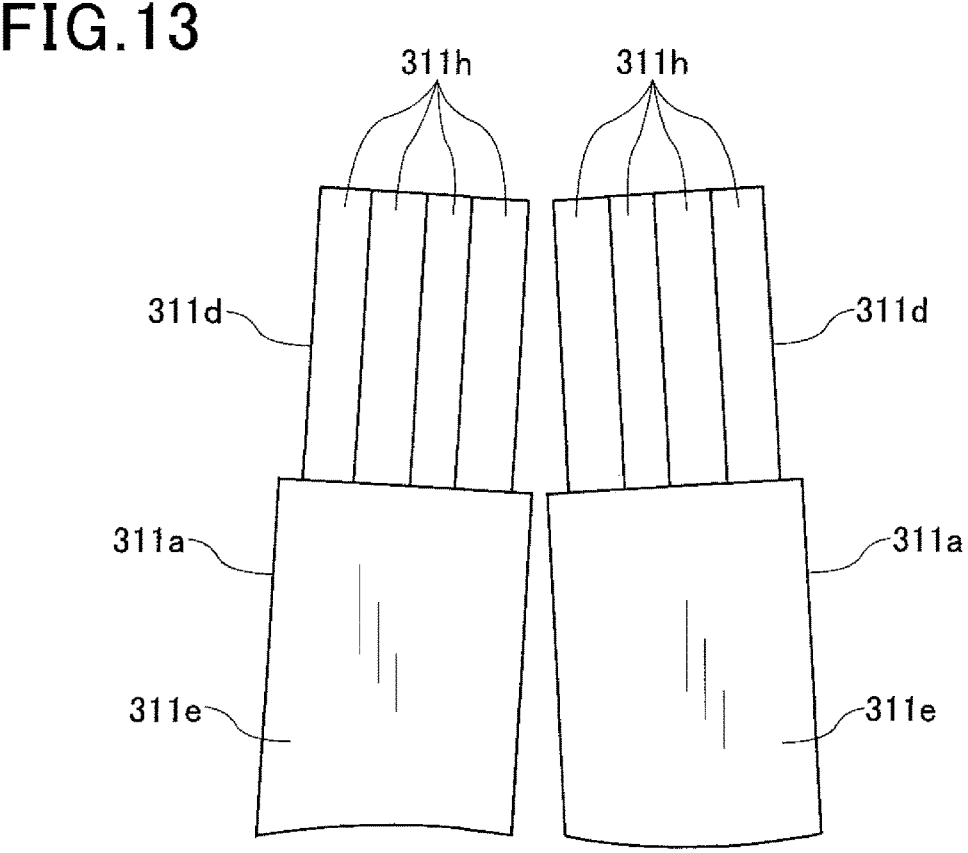
FIG. 13 is a front view of a pair of electric conductor segments, before being welded to each other, according to a third embodiment.
Figure 14:
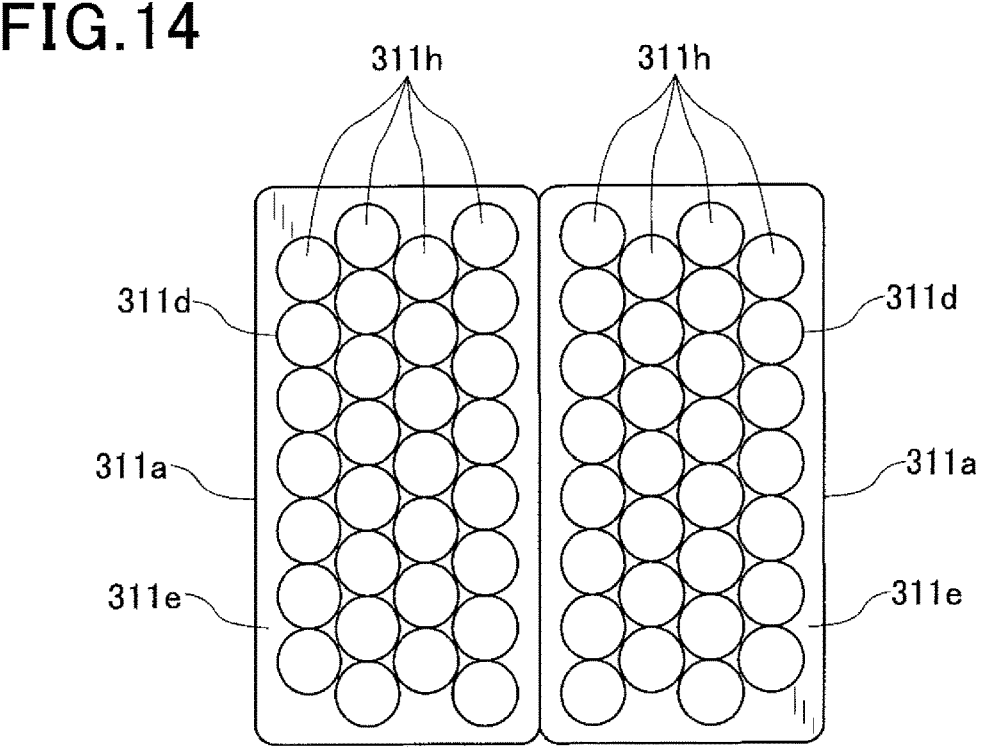
FIG. 14 is a top view of the pair of electric conductor segments, before being welded to each other, according to the third embodiment.

Specifically, in the present embodiment, as shown in FIGS. 13 and 14, each of the electric conductor segments 311a includes an electric conductor 311d and a conductor-insulating member 311e. The electric conductor 311d is constituted of a plurality of electric conductor wires 311h having a circular cross-sectional shape. The conductor-insulating member 311e is made, for example, of an electrically-insulative resin. The conductor-insulating member 311e is provided so as to cover the entire outer periphery of the electric conductor 311d except for a pair of end portions of the electric conductor 311d.

Figure 15:
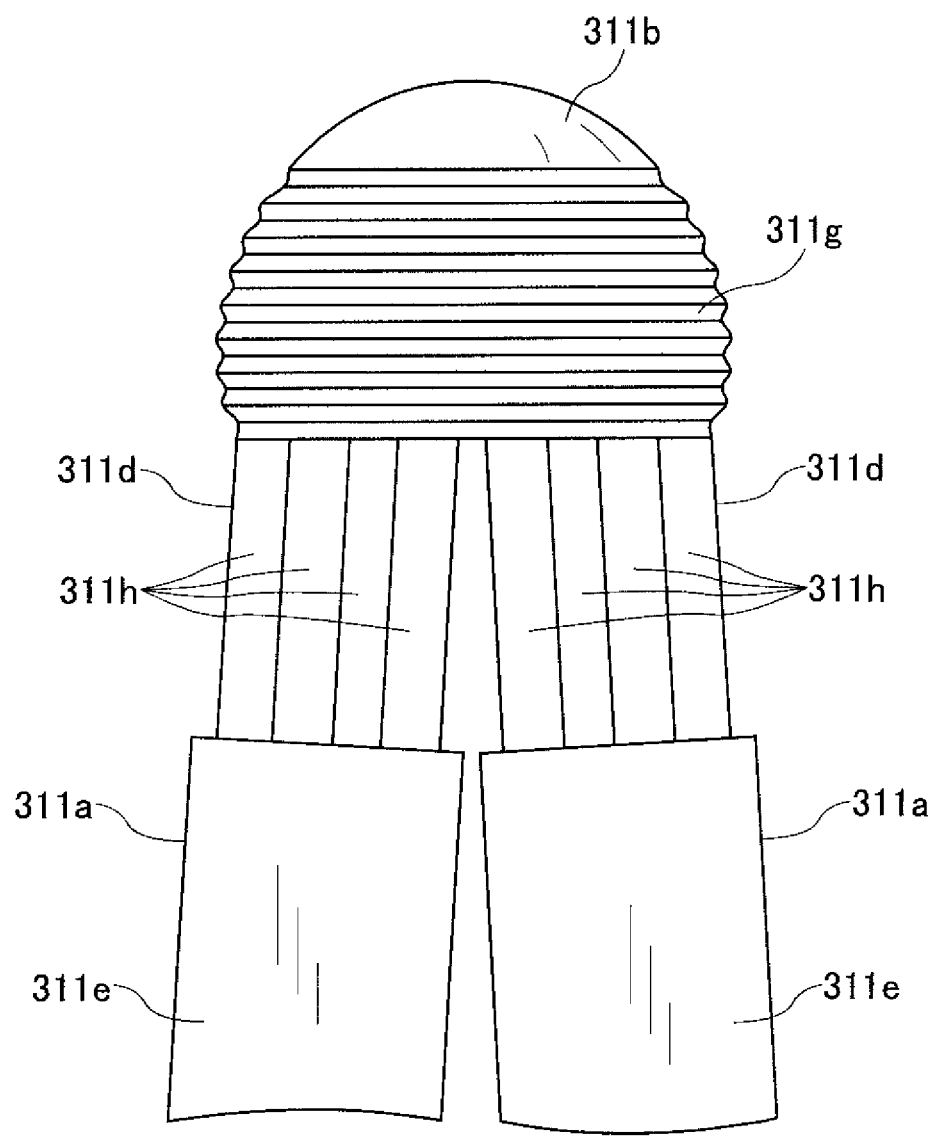
FIG. 15 is a front view of the pair of electric conductor segments, after being welded to each other, according to the third embodiment.
Figure 16:
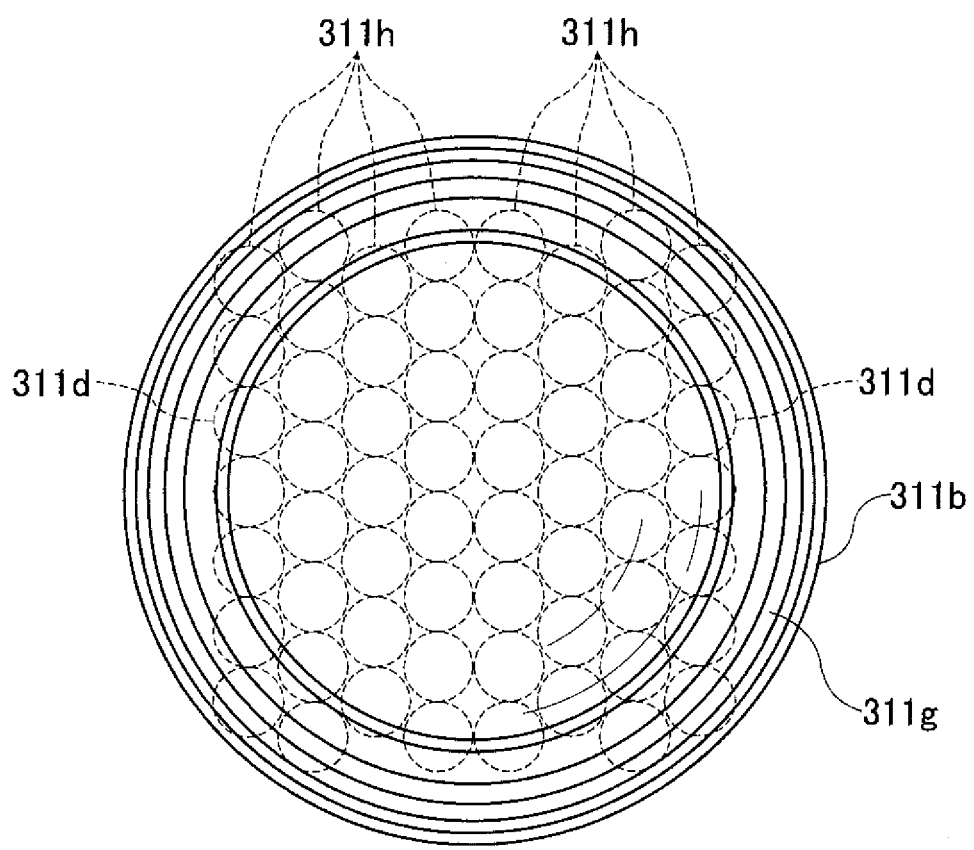
FIG. 16 is a top view of the pair of electric conductor segments, after being welded to each other, according to the third embodiment.

Moreover, in the present embodiment, as shown in FIGS. 15 and 16, each of the welds 311b is formed by welding end portions of one pair of the electric conductors 311d of the electric conductor segments 311a. Moreover, each of the welds 311b has the uneven portion 311g formed on the surface thereof.

More specifically, in the present embodiment, as shown in FIG. 15, the uneven portion 311g is formed over the entire surface of the weld 311b except for a predetermined area at the distal end of the weld 311b on the opposite side to the pair of the electric conductors 311d. That is, the uneven portion 311g is formed on part of the surface of the weld 311b which is adjacent to the pair of the electric conductors 311d.

In the present embodiment, as shown in FIG. 16, each of the welds 311b is formed so that when viewed from the opposite side of the weld 311b to the pair of the electric conductors 311d, a region surrounded (or demarcated) by the outline of the weld 311b protrudes from a region surrounded by the outline of the pair of the electric conductors 311d.

In the present embodiment, for each of the welds 311b, the uneven portion 311g of the weld 311b is formed, during the welding of the end portions of the pair of the electric conductors 311d, by vibration of the molten parts of the end portions of the pair of the electric conductors 311d; the vibration is caused by a shield gas flow and a magnetic field created during the welding.

Figure 17:
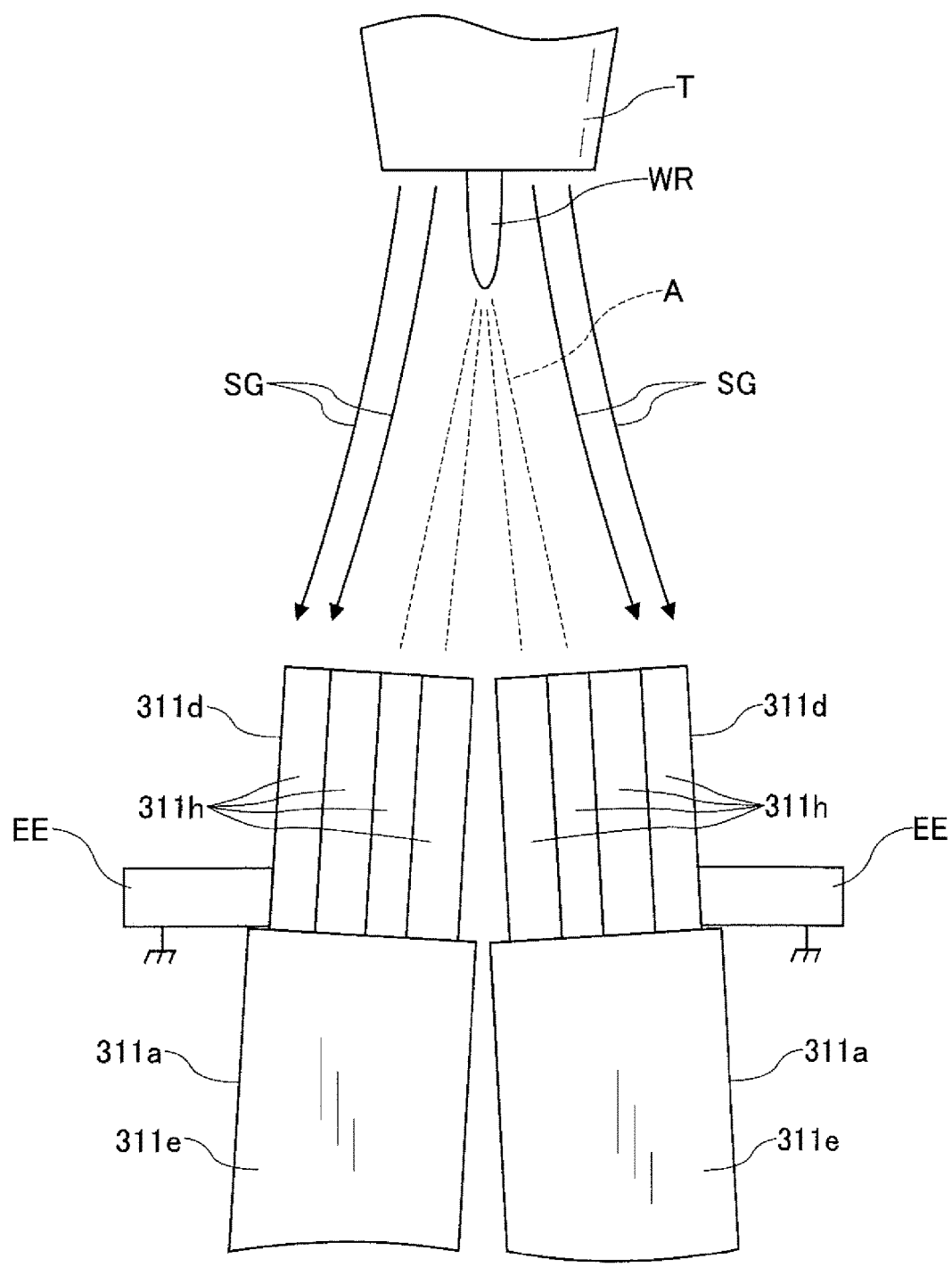
FIG. 17 is a first schematic view illustrating a method of forming uneven portions of welds according to the third embodiment.
Figure 18:
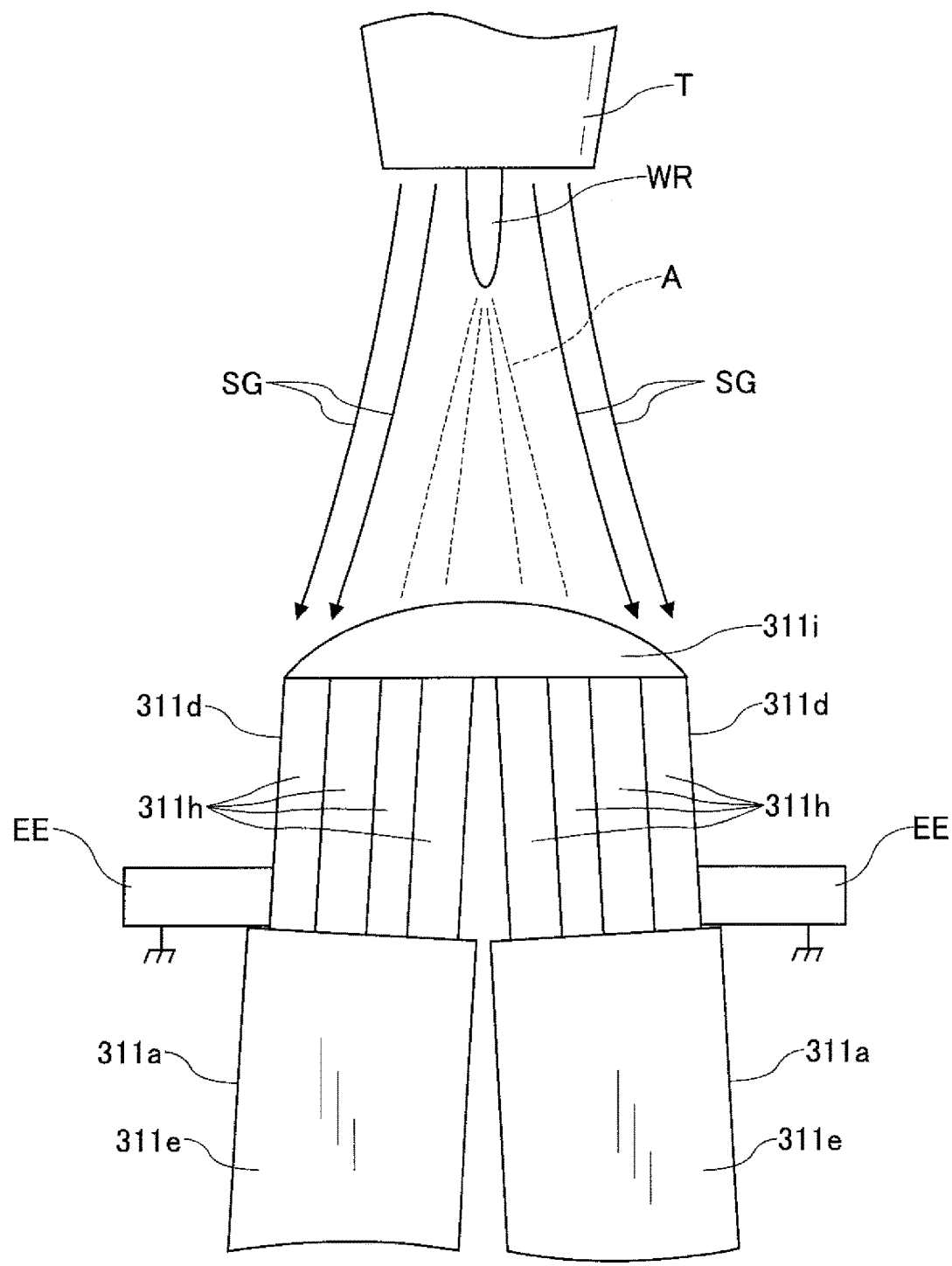
FIG. 18 is a second schematic view illustrating the method of forming the uneven portions of the welds according to the third embodiment.
Figure 19:
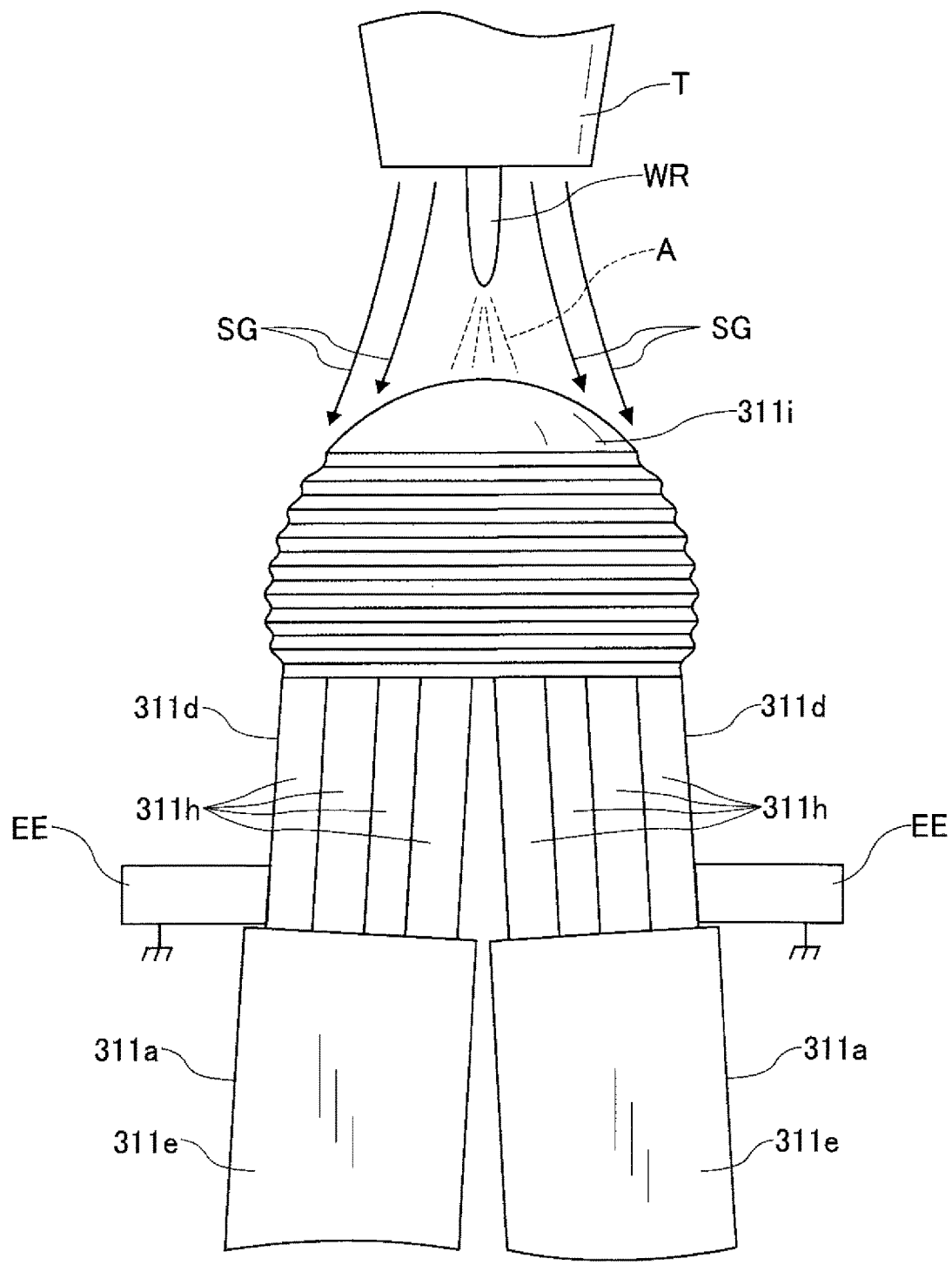
FIG. 19 is a third schematic view illustrating the method of forming the uneven portions of the welds according to the third embodiment.
Figure 20:
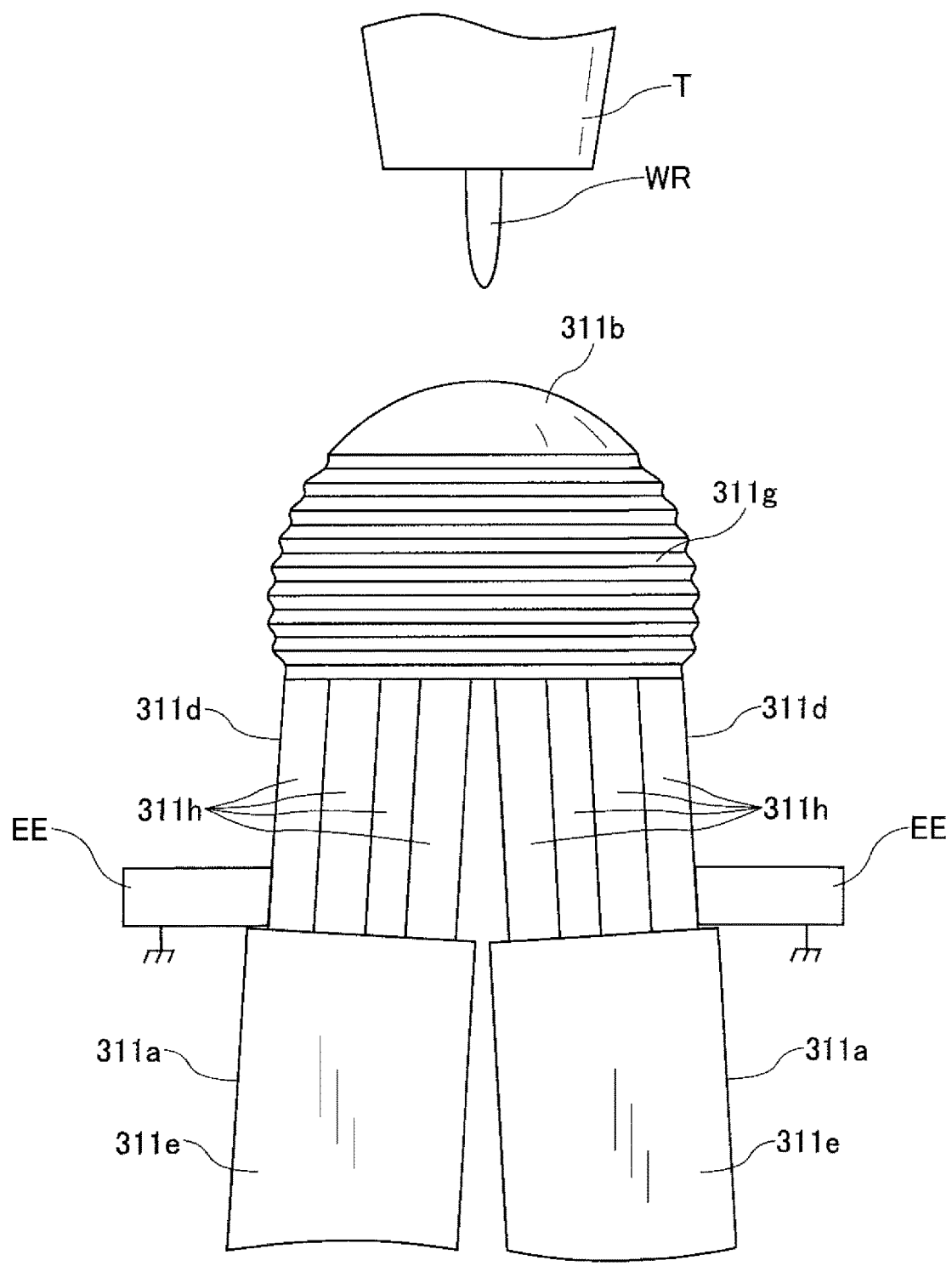
FIG. 20 is a fourth schematic view illustrating the method of forming the uneven portions of the welds according to the third embodiment.

Specifically, as shown in FIG. 17, in the welding process, the end portions of the pair of the electric conductors 311d are respectively grounded by a pair of earth electrodes EE. To prevent the mixing-in of nitrogen and/or oxygen, a shield gas SG is discharged from a distal end (i.e., the lower end in FIG. 17) of a torch T to the end portions of the pair of the electric conductors 311d. Upon application of a voltage, which takes the earth electrodes EE as a reference, to a welding rod WR, an electric arc A is generated between a distal part (i.e., a lower part in FIG. 17) of the welding rod WR and distal parts (upper parts in FIG. 17) of the end portions of the pair of the electric conductors 311d. By the generated electric arc A, as shown in FIG. 18, the distal part of the welding rod WR and the distal parts of the end portions of the pair of the electric conductors 311d are melted, forming a molten metal mixture 311i at the distal ends of the end portions of the pair of the electric conductors 311d. Further, as shown in FIG. 19, the molten metal mixture 311i grows with time to become large. Moreover, with the generation of the electric arc A, a magnetic field is created around the distal parts of the end portions of the pair of the electric conductors 311d. The magnetic field and the flow of the shield gas SG from the distal end of the torch T to the end portions of the pair of the electric conductors 311d cause the electric conductor wires 311h constituting the pair of the electric conductors 311d to vibrate. Further, with the vibration of the electric conductor wires 311h, the molten metal mixture 311i also vibrates and ripples. Consequently, upon being cooled after the welding process, as shown in FIG. 20, the molten metal mixture 311i is solidified to form the weld 311b that has the uneven portion 311g formed on the surface thereof.

According to the present embodiment, it is possible to achieve almost the same advantageous effects as achievable according to the first embodiment.

In particular, in the present embodiment, for each of the welds 311b, the uneven portion 311g of the weld 311b is formed, during the welding of the end portions of the pair of the electric conductors 311d, by vibration of the molten parts of the end portions of the pair of the electric conductors 311d; the vibration is caused by the shield gas flow and the magnetic field created during the welding. Therefore, unlike the teaching of Japanese Patent No. JP5510709B2, blow holes are formed neither on the surfaces of the welds 311b nor inside the welds 311b. Consequently, it becomes possible to reliably form the uneven portions 311g on the surfaces of the welds 311b without lowering the mechanical strength of the welds 311b. As a result, it becomes possible to enhance the adhesion force of the weld-insulating members 311c (not shown) to the respective welds 311b.

Moreover, in the present embodiment, for each of the welds 311b, the uneven portion 311g of the weld 311b is formed during the welding of the end portions of the pair of the electric conductors 311d. Therefore, no additional step is needed for forming the uneven portion 311g. Consequently, it becomes possible to reduce the number of steps of manufacturing the rotating electric machine 1.

In addition, the welding may be performed without using the shield gas SG; in this case, the vibration may be caused only by the magnetic field created during the welding. That is, the vibration may be caused by at least one of the shield gas flow and the magnetic field created during the welding.

Furthermore, in the present embodiment, each of the electric conductors 311d is constituted of the plurality of electric conductor wires 311h. Therefore, the plurality of electric conductor wires 311h are caused, by the shield gas flow and the magnetic field created during the welding, to separately vibrate, thereby making it easier for the molten metal mixture 311i to vibrate and ripple. Consequently, it becomes possible to reliably form the fine uneven portions 311g on the surfaces of the welds 311b. As a result, it becomes possible to further enhance the adhesion force of the weld-insulating members 311c (not shown) to the respective welds 311b.

Figure 21:
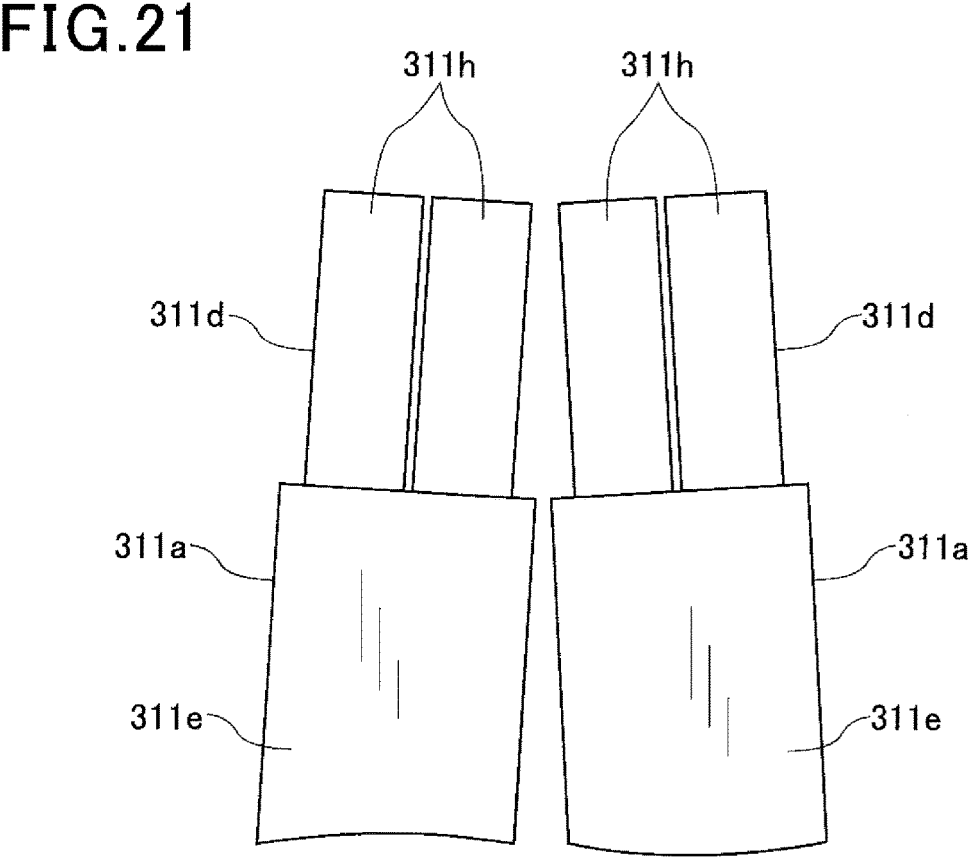
FIG. 21 is a front view of a pair of electric conductor segments according to a first modification.
Figure 22:
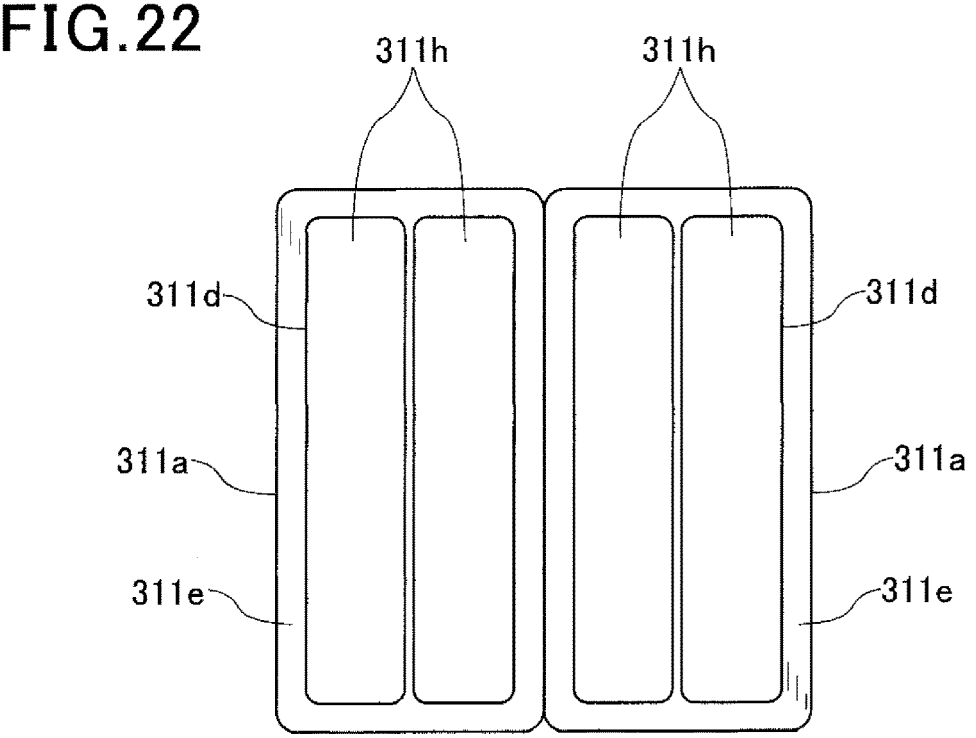
FIG. 22 is a top view of the pair of electric conductor segments according to the first modification.
Figure 23:
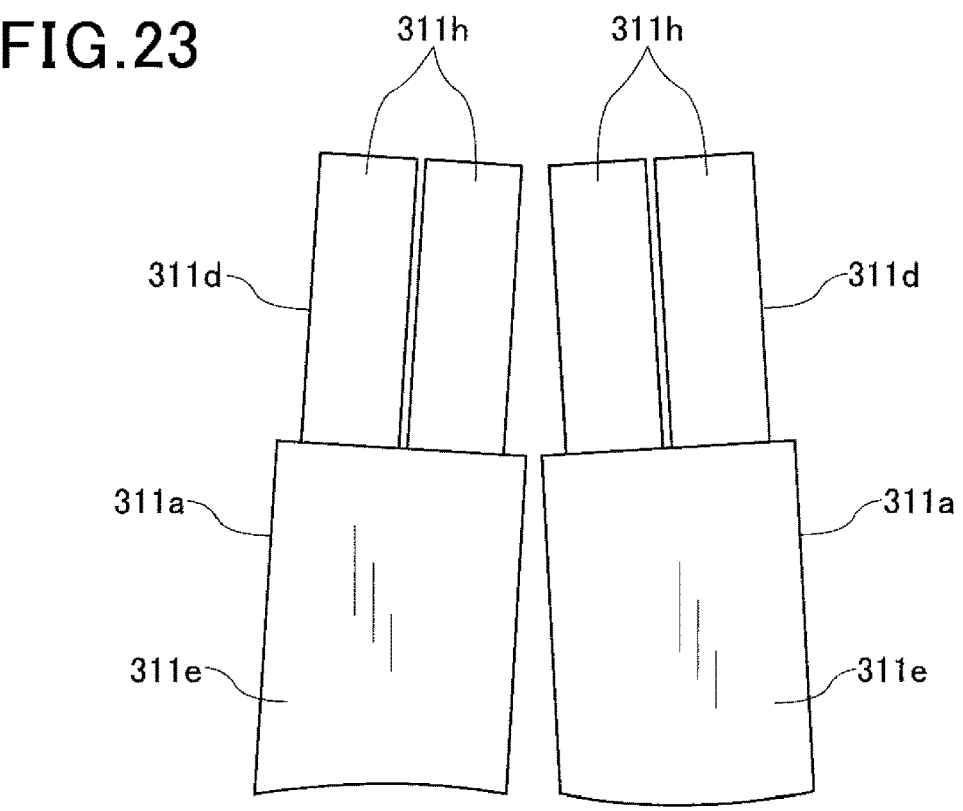
FIG. 23 is a front view of a pair of electric conductor segments according to a second modification.
Figure 24:
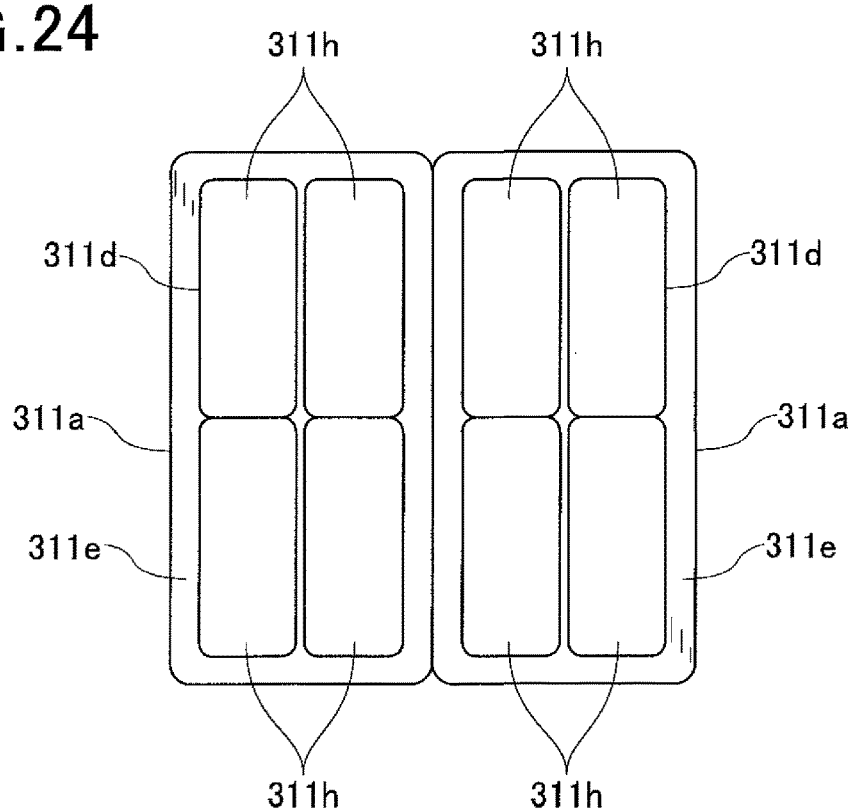
FIG. 24 is a top view of the pair of electric conductor segments according to the second modification.
Figure 25:
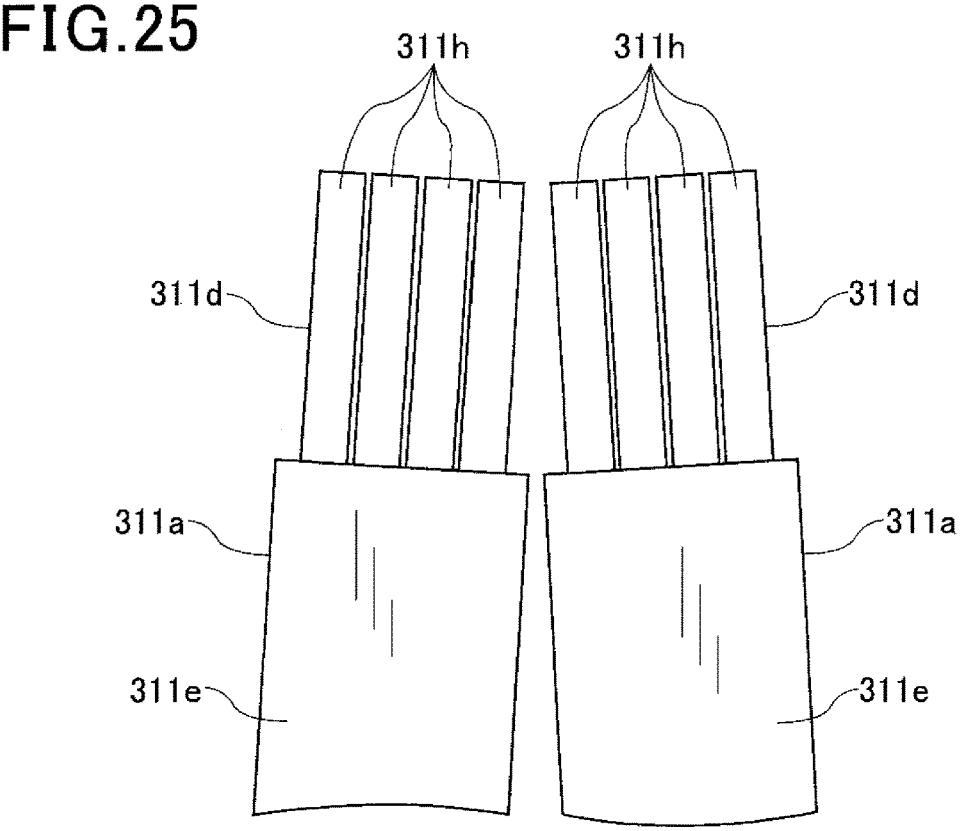
FIG. 25 is a front view of a pair of electric conductor segments according to a third modification.
Figure 26:
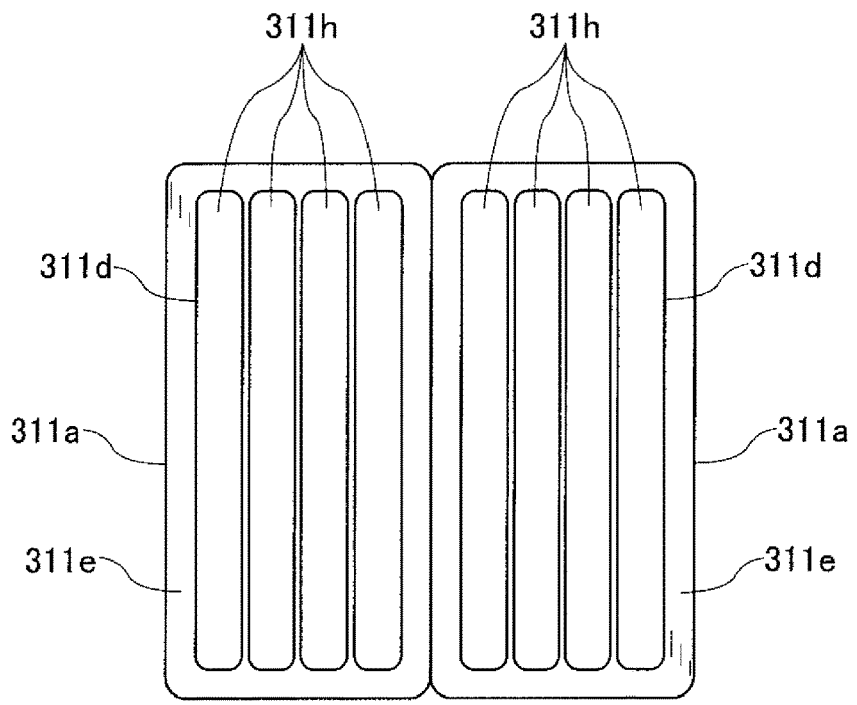
FIG. 26 is a top view of the pair of electric conductor segments according to the third modification.

In addition, with the same cross-sectional area of each of the electric conductors 311d, the smaller the cross-sectional area of each of the electric conductor wires 311h constituting the electric conductors 311d, the easier for the electric conductor wires 311h to separately vibrate and thus the easier for the fine uneven portions 311g to be formed on the surfaces of the welds 311b. For example, it is easier for the electric conductor wires 311h to separately vibrate and thus easier for the fine uneven portions 311g to be formed on the surfaces of the welds 311b in the case of configuring the electric conductors 311d as shown in FIGS. 23 and 24 than in the case of configuring the electric conductors 311d as shown in FIGS. 21 and 22. Moreover, it is easier for the electric conductor wires 311h to separately vibrate and thus easier for the fine uneven portions 311g to be formed on the surfaces of the welds 311b in the case of configuring the electric conductors 311d as shown in FIGS. 25 and 26 than in the case of configuring the electric conductors 311d as shown in FIGS. 23 and 24. Furthermore, it is easier for the electric conductor wires 311h to separately vibrate and thus easier for the fine uneven portions 311g to be formed on the surfaces of the welds 311b in the case of configuring the electric conductors 311d as shown in FIGS. 13 and 14 than in the case of configuring the electric conductors 311d as shown in FIGS. 25 and 26.

Furthermore, in the present embodiment, each of the electric conductor wires 311h constituting the electric conductors 311d has the circular cross-sectional shape. Therefore, it is possible to secure sufficient gaps between the electric conductor wires 311h in each of the electric conductors 311d (see FIG. 14). With the sufficient gaps, the electric conductor wires 311h can be caused, by the shield gas flow and the magnetic field created during the welding, to greatly vibrate. Consequently, it becomes possible to reliably form the uneven portions 311g having a large height of the annular protrusions (or a large depth of the annular recesses) on the surfaces of the welds 311b. As a result, it becomes possible to further enhance the adhesion force of the weld-insulating members 311c (not shown) to the respective welds 311b.

It should be noted that each of the electric conductor wires 311h constituting the electric conductors 311d may also have a substantially rectangular cross-sectional shape as shown in FIGS. 21-26. hi addition, end portions of the electric conductors 311d may also be welded by welding methods other than the arc welding used in the present embodiment.

While the above particular embodiments and their modifications have been shown and described, it will be understood by those skilled in the art that the present invention can also be embodied in various other modes without departing from the spirit of the present invention.

For example, in the first to the third embodiments, each of the welds is formed so that when viewed from the opposite side of the weld to the pair of the electric conductors, the region surrounded (or demarcated) by the outline of the weld protrudes from the region surrounded by the outline of the pair of the electric conductors (see FIGS. 5, 11 and 16).

However, each of the welds may also be formed so that when viewed from the opposite side of the weld to the pair of the electric conductors, the region surrounded by the outline of the weld is confined (or limited) within the region surrounded by the outline of the pair of the electric conductors.

Figure 27:
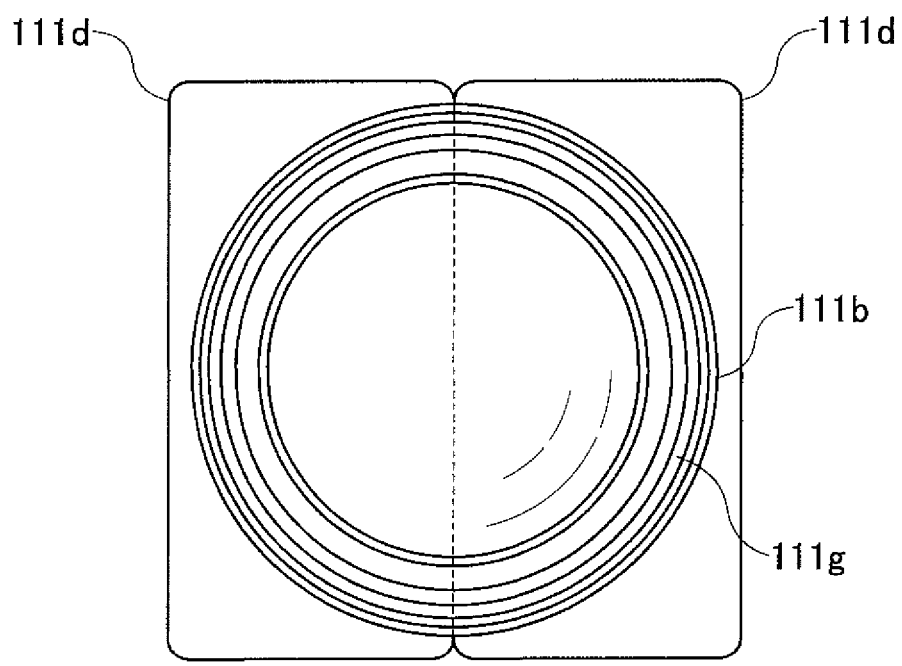
FIG. 27 is a top view of a weld formed between a pair of electric conductor segments according to a fourth modification.

For example, as shown in FIG. 27, in the first embodiment, each of the welds 111b may be formed so that when viewed from the opposite side of the weld 111b to the pair of the electric conductors 111d, the region surrounded by the outline of the weld 111b is confined within the region surrounded by the outline of the pair of the electric conductors 111d. With this formation, it is possible to minimize the size of the welds 111b, thereby maximizing the spatial distance between each adjacent pair of the welds 111b. Consequently, even if the weld-insulating members 111c were peeled off from the respective welds 111b, it would still be possible to secure electrical insulation between each adjacent pair of the welds 111b.

In the first embodiment, the conductor-insulating members 111e are provided so as to cover the entire outer peripheries of the respective electric conductors 111d except for the end portions of the electric conductors 111d. Moreover, each of the weld-insulating members 111c is provided so as to cover the surface of one of the welds 111b and end portions of the conductor-insulating members 111e respectively covering the pair of the electric conductors 111d joined by the weld 111b (see FIG. 6).

Figure 28:
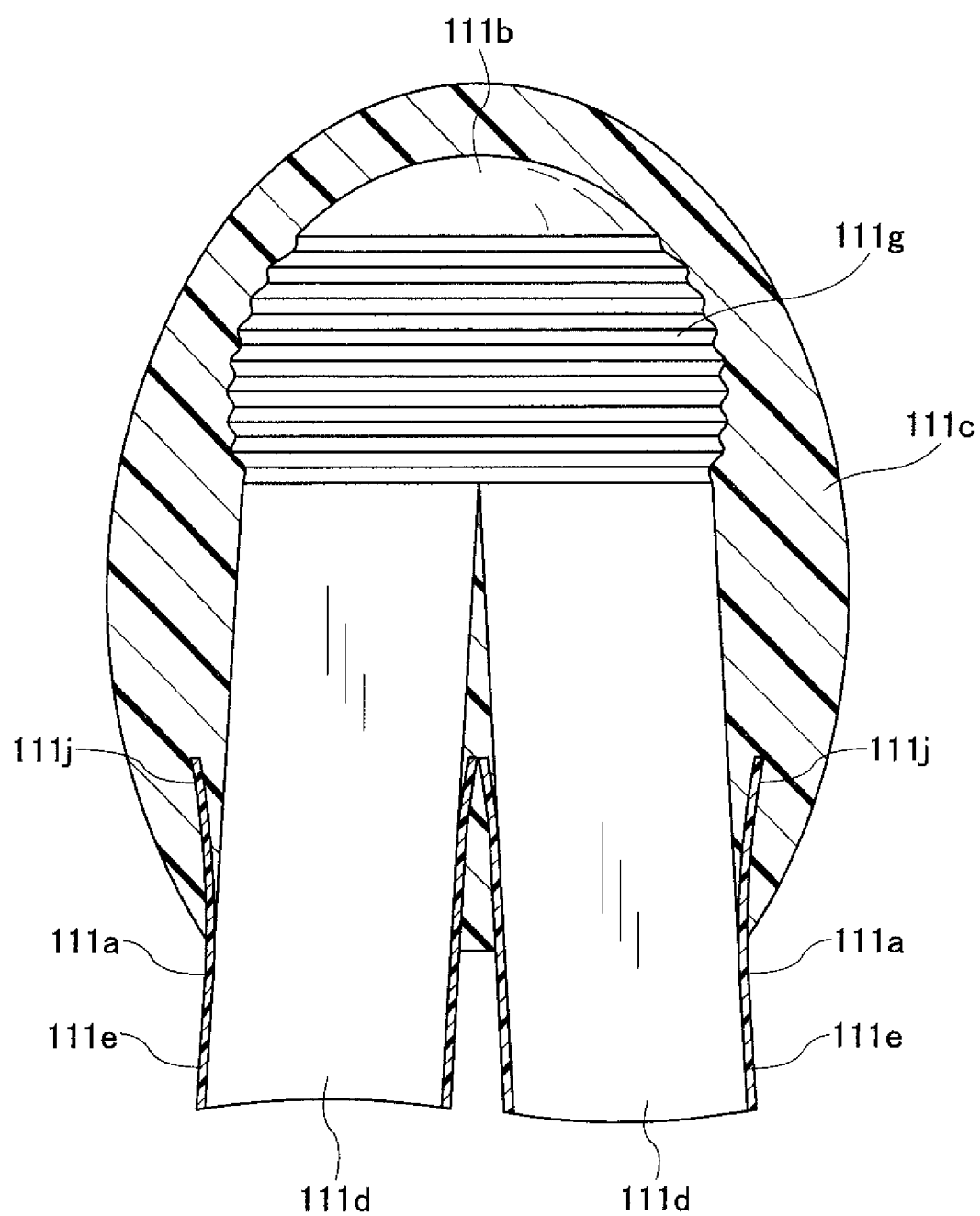
FIG. 28 is a partially cross-sectional view illustrating the formation of conductor-insulating members according to a fifth modification.

However, as shown in FIG. 28, each of the conductor-insulating members 111e may have an increased-diameter portion 111j formed adjacent to the end portion of the respective one of the electric conductors 111d so as to be increased in diameter in a direction toward the end portion of the respective electric conductor 111d. Moreover, each of the weld-insulating members 111c may be provided so as to cover the surface of one of the welds 111b and the increased-diameter portions 111j of the conductor-insulating members 111e respectively covering the pair of the electric conductors 111d joined by the weld 111b. In this case, with the increased-diameter portions 111j of the conductor-insulating members 111e, it is possible to more reliably suppress the weld-insulating members 111c from peeling off from the respective welds 111b.

In the first to the third embodiments, for each of the welds, the uneven portion is formed over the entire surface of the weld except for the predetermined area at the distal end of the weld on the opposite side to the pair of the electric conductors. That is, the uneven portion is formed on part of the surface of the weld which is adjacent to the pair of the electric conductors (see FIGS. 4, 10 and 15).

However, for each of the welds, the uneven portion of the weld may also be not formed on a predetermined area of the surface of the weld which is adjacent to the pair of the electric conductors.

Figure 29:
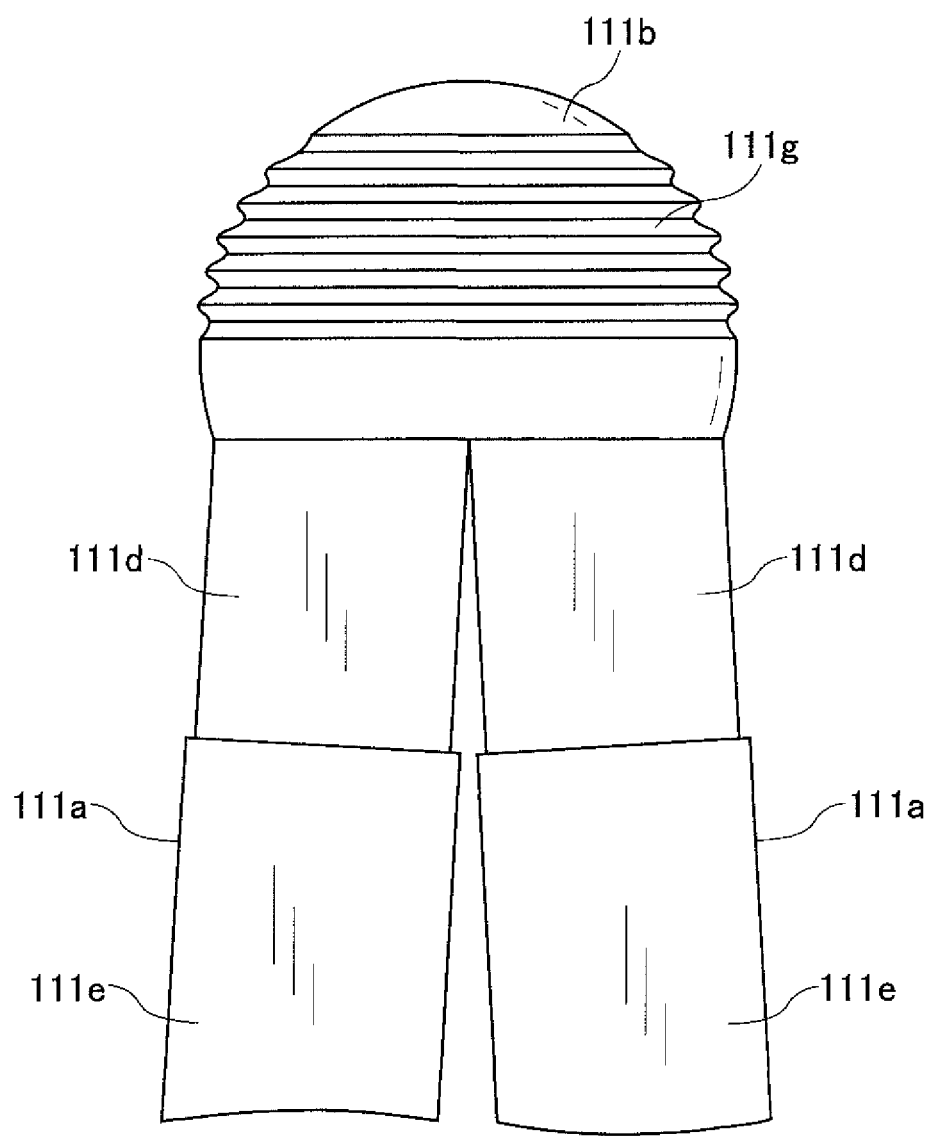
FIG. 29 is a front view illustrating the formation of an uneven portion of a weld according to a sixth modification.

For example, as shown in FIG. 29, in the first embodiment, for each of the welds 111b, the uneven portion 111g of the weld 111b may also be not formed on a predetermined area of the surface of the weld 111b which is adjacent to the pair of the electric conductors 111d. In the vicinity of the boundary between the weld 111b and the pair of the electric conductors 111d, the cohesive strength between the weld 111b and the pair of the electric conductors 111d is high and thus the degree of expansion and contraction of the weld 111b with temperature change is low. Therefore, with the uneven portion 111g not formed on the predetermined area of the surface of the weld 111b which is adjacent to the pair of the electric conductors 111d, it is possible to reduce the cost of forming the uneven portion 111g and increase the mechanical strength of the weld 111b while effectively suppressing the weld-insulating member 111c from peeling off from the weld 111b.

In the first to the third embodiments, the present invention is directed to the rotating electric machine 1 which is configured as a motor-generator for use in a motor vehicle. However, the present invention can also be applied to other rotating electric machines, such as an electric motor or an electric generator.

What is claimed is:

1. A rotating electric machine comprising:
   a weld formed by welding end portions of a pair of electric conductors for forming a coil; and
   a weld-insulating member that covers, at least, a surface of the weld,
   wherein
   the weld has an uneven portion formed on at least part of the surface thereof, and
   the uneven portion is constituted of a plurality of annular recesses and a plurality of annular protrusions, the annular recesses being formed alternately and continuously with the annular protrusions.

2. The rotating electric machine as set forth in claim 1, wherein the weld is formed so that when viewed from an opposite side of the weld to the pair of electric conductors, a region surrounded by an outline of the weld is within a region surrounded by an outline of the pair of electric conductors.

3. The rotating electric machine as set forth in claim 1, further comprising a pair of conductor-insulating members that respectively cover entire outer peripheries of the pair of electric conductors except for the end portions of the pair of electric conductors,
   wherein
   each of the pair of conductor-insulating members has an increased-diameter portion formed adjacent to the end portion of the respective one of the pair of electric conductors so as to be increased in diameter in a direction toward the end portion of the respective electric conductor, and
   the weld-insulating member covers the increased-diameter portions of the pair of conductor-insulating members as well as the surface of the weld.

4. The rotating electric machine as set forth in claim 1, wherein the uneven portion is formed on the surface of the weld except for a predetermined area of the surface, the predetermined area being adjacent to the pair of electric conductors.

5. A method of manufacturing the rotating electric machine as set forth in claim 1, the method comprising:
   welding the end portions of the pair of electric conductors to form the weld; and
   forming the uneven portion by pressing a die, which has protrusions and recesses formed therein, against the surface of the weld.

6. A method of manufacturing the rotating electric machine as set forth in claim 1, the method comprising:
   welding the end portions of the pair of electric conductors to form the weld; and
   forming the uneven portion by cutting the surface of the weld with a cutting tool.

7. A method of manufacturing the rotating electric machine as set forth in claim 1, the method comprising:
   welding the end portions of the pair of electric conductors to form the weld; and
   forming the uneven portion, during the welding of the end portions of the pair of electric conductors, by vibration of molten parts of the end portions of the pair of electric conductors, the vibration being caused by at least one of a shield gas flow and a magnetic field created during the welding.

8. The method as set forth in claim 7, wherein each of the pair of electric conductors is constituted of a plurality of electric conductor wires.

9. The method as set forth in claim 8, wherein each of the electric conductor wires has a circular cross-sectional shape.

* * * * *